US008654281B2

(12) United States Patent
Bos et al.

(10) Patent No.: US 8,654,281 B2
(45) Date of Patent: Feb. 18, 2014

(54) PHOTO-PATTERNED PRE-TILT LIQUID CRYSTAL CELLS, LENSES AND METHODS

(75) Inventors: Philip Bos, Hudson, OH (US); Vassili V. Sergan, Carmichael, CA (US); Tatiana A. Sergan, Carmichael, CA (US)

(73) Assignees: California State University, Sacramento, Sacramento, CA (US); Kent State University, Kent, OH (US)

( * ) Notice: Subject to any disclaimer, the term of this patent is extended or adjusted under 35 U.S.C. 154(b) by 526 days.

(21) Appl. No.: 12/807,326

(22) Filed: Sep. 2, 2010

(65) Prior Publication Data

US 2011/0170039 A1   Jul. 14, 2011

Related U.S. Application Data

(60) Provisional application No. 61/275,962, filed on Sep. 4, 2009.

(51) Int. Cl.
*G02F 1/1333* (2006.01)
*G02F 1/1337* (2006.01)

(52) U.S. Cl.
USPC ............................................. 349/88; 349/128

(58) Field of Classification Search
USPC ............... 349/88–94, 183, 188, 128
See application file for complete search history.

(56) References Cited

U.S. PATENT DOCUMENTS

| | | | | |
|---|---|---|---|---|
| 2005/0248705 | A1* | 11/2005 | Smith et al. | 349/124 |
| 2006/0202162 | A1* | 9/2006 | Lin et al. | 252/299.4 |
| 2008/0284960 | A1* | 11/2008 | Sohn et al. | 349/128 |
| 2008/0316395 | A1* | 12/2008 | O'Keeffe | 349/88 |
| 2011/0090415 | A1* | 4/2011 | Asatryan et al. | 349/33 |
| 2011/0109824 | A1* | 5/2011 | Galstian | 349/33 |
| 2011/0122362 | A1* | 5/2011 | Galstian | 349/191 |
| 2012/0224127 | A1* | 9/2012 | Kwok et al. | 349/123 |

OTHER PUBLICATIONS

S.G. Kim, S.M. Kim, Y.S. Kim, H.K. Lee, S.H. Lee, G.D. Lee, J.J. Lyu, and K.H. Kim "Stabilization of the liquid crystal director in the patterned vertical alignment mode through formation of pre-tilt angle by reactive mesogen" Appl.Phys.Lett. 90, 261910 (2007).

T.J. Chen and K.L. Chu 'Pre-tilt angle control for single-cell gap transflective liquid crystal cells Appl.Phys.Lett 92, 091102 (2008).

Y. Kim, J. Francl, B. Taheri, and J. West "A method for the formation of polymer walls in liquid crystal/polymer mixtures" Appl.Phys.Lett. 72(18), 2253-2255(1998).

H. Ren, S. Wu, and Y. Lin "In situ observation of fringing-field-induced phase separation in a liquid-crystal-monomer mixture" Phys.Rev.Lett.100,117801(2008).

(Continued)

*Primary Examiner* — Bumsuk Won
*Assistant Examiner* — Charles Chang
(74) *Attorney, Agent, or Firm* — Hudak, Shunk & Farine Co. LPA

(57) ABSTRACT

Liquid crystal cells and lenses having a variable resulting pre-tilt across two or more areas of the cell, and in particular, cells and lenses are provided wherein a resulting pre-tilt is varied across the cell according to any desired birefringence profile that can be utilized in liquid crystalline optical elements and liquid crystal displays. Methods of fabrication of the liquid crystal cells with variable resulting pre-tilt are disclosed.

30 Claims, 31 Drawing Sheets

(56) References Cited

OTHER PUBLICATIONS

D. Voloschenko, O. Pishnyak, S. Shiyanovskii, and O. Lavrentovich "Effect of director distortion on morphologies of phase separation in liquid crystals" Phys.Rev. E 65, 060701 (R) (2002).

Mao Ye, Susumu Sato "Liquid crystal lens with focus movable along and off axis" Optics Communications 225, p. 277-280 (2003).

Bin Wang, Mao Ye, Susumu Sato "Liquid crystal lens with stacked structure of liquid-crystal layers", Optics Communications 250, p. 266-273 (2005).

Susumu Sato, Mao Ye "Liquid crystal lens prepared using molecular orientation effects at the alignment layers (Proceedings Paper)" Liquid Crystals IX Abstract (2005).

Mao Ye, Bin Wang, Susumu Sato "liquid crystal lens with focus movable in focal plane" Optics Communications 259, p. 710-722 (2006).

Hongwen Ren, Shin-Tson Wu, "Adaptive liquid crystal lens with large focal length tunability" Optics Express 11292 vol. 14, No. 23 (2006).

H. Ren, Y. Fan, Y. Lin, S. Wu "Tunable-focus microlens arrays using nanosized polymer-dispersed liquid crystal droplets" Optics Communications 247, p. 101-106 (2005).

Guoqiang Li "Switchable liquid-crystal lens could correct vision" SPIE newsroom Abstract (2009).

I. Dierking, L. Kosbar, A. Ardakani, A. Lowe, G. Held "Network morphology of polymer stabilized liquid crystals" Appl. Phys. Lett. 71 (17), p. 2454-2456 (1997).

G. Held, L. Kosbar, I. Dierking, A. Lowe, G. Grinstein, V. Lee, R. Miller "Confocal Microscopy Study of Texture Transitions in Polymer Stabilied Cholesteric Liquid Crystal" Physical Review Letters vol. 79, No. 18, p. 3443-3446 (1997).

H. Ren, Y. Fan, S. Gauza, S. Wu "Tunable microlens arrays using polymer network liquid crystal" Optics Communications 230, p. 267-271 (2004).

H. Ren and S. Wu "Tunable electronic lens using a gradient polymer network liquid crystal" Applied Physics Letters vol. 82, No. 1, p. 22-24 (2003).

S. Masuda, T. Nose and S. Sato "Optical properties of an UV-cured liquid-crystal microlens array" Applied Optics vol. 37, No. 11, p. 2067-2073 (1998).

R. Hikmet and C. de Witz "Gel layers for inducing adjustable pretilt angles in liquid crystal systems" J. Appl. Phys. 70(3), p. 1265-1269 (1991).

M. Hain, R. Glockner, S. Bhattacharya, D. Dias, S. Stankovic and T. Tschudi "Fast switching liquid crystal lenses for a dual focus digital versatile disc pickup" Optics Communications vol. 188, Issues 5-6 p. 291-299 (2001).

C. Fowler and E. Pateras "Liquid crystal lens review" Ophthal. Physiol. Opt., vol. 10, p. 186-194 Apr. (1990).

B. Bagwell, D. Wick, R. Batchko, J. Mansell, T. Martinez, S. Restaino, D. Payne, J. Harriman, S. Serati, G. Sharp and J. Schwiegerling "Liquid crystal based active optics" Society of Photo-Optical Instrumentation Engineers (2006).

G. Love and A. Naumov "Modal liquid crystal lenses" Liquid Crystals Today, (p. 1-4) (2000).

Y. Liu, X. Sun, Q. Wang "focus-switchable lens made of polymer-liquid crystal composite" Journal of Crystal Growth 288 p. 192-194 (2006).

Bethany Halford "Spectacles made with switchable material could advance vision correction" Chemical & Engineering News (2006).

V. Presnyakov and T. Galstian "Electrically tunable polymer stabilized liquid-crystal lens" Journal of Applied Physics 97 102101 (2005).

M. Hain, R. Glockner, S. Bhattacharya, D. Dias, S. Stankovic, T. Tschudi "Fast switching liquid crystal lenses for a dual focus digital versatile disc pickup" Optics Communication 188, p. 291-299 (2001).

Y. Liu, X. Sun, Q. Wang "A focus-switchable lens made of polymerliquid crystal composite" Journal of Crystal Growth 288, p. 192-194 (2006).

O. Pishnyak, S. Sato and O. Lavretovich "Electrically tunable lens based on a dual-frequency nematic liquid crystal" Applied Optics vol. 45, No. 19, p. 4576-4582 (2006).

R. Gunasekaran, M. Agarwal, A. Singh, P. Dubasi, P. Coane, K. Varahramyan "Design and fabrication of fluid controlled dynamic optical lens system" Optics and Lasers in Engineering 43, p. 686-703 (2005).

Ono, M. Yoshida, T. Morisaki "Characteristics of optically controllable focusing lens generated in guest-host liquid crystals" Optics Communications 211, p. 309-318 (2002).

* cited by examiner

PHOTO-PATTERNED PRE-TILT LIQUID CRYSTAL CELLS, LENSES AND METHODS

CROSS-REFERENCE

This application claims the benefit of priority under 35 U.S.C. §119 of U.S. Provisional Application Ser. No. 61/275,962, filed on Sep. 4, 2009, herein fully incorporated by reference.

STATEMENT OF GOVERNMENT INTEREST

The U.S. Government has a paid-up license in the inventions and the right, in limited circumstances, to require the patent owner to license others on reasonable terms as provided for by terms of Contract Number FA 7014-07-C-0013 awarded by the U.S. Air Force.

FIELD OF THE INVENTION

The present invention relates to liquid crystal cells and lenses having a variable pre-tilt across two or more areas of the cell, and in particular, cells and lenses are provided wherein a resulting pre-tilt is varied across the cell according to any desired birefringence profile, and can be utilized in liquid crystalline optical elements and liquid crystal displays. Methods of fabrication of the liquid crystal cells and lenses with variable resulting pre-tilt are disclosed.

BACKGROUND OF THE INVENTION

Electro-optical lenses that utilize birefringent liquid crystal to alter their optical power are well known. They have the inherent advantage over conventional glass or plastic optical lenses of being able to switch their optical power by the application of an electric field. One drawback of many liquid crystal electro-optic lens designs is that a large number of lithographically etched transparent electrodes are often required to create the desired phase profile.

One basic structure of electro-optic liquid crystal lenses is that of a thin layer of liquid crystal sandwiched between two transparent substrates. Onto the inner surfaces of each substrate, a transparent metallic electrode structure is formed. An alignment layer is formed on top of the electrode layers to establish a specific orientation, i.e., pre-tilt, of the liquid crystal molecules when there is no electric field present. An electric field is established across the liquid crystal layer when voltage is applied to one electrode layer and an electric potential is created between the electrodes. If the electrode structure is patterned, a spatially varying voltage can be applied to the electrodes, and a gradient in the field is created that gives rise to a gradient in the index of refraction of the liquid crystal layer. With proper design of the electrode structure and the applied voltages, an electro-optic lens can be fabricated. Electro-optic converging lenses can be made with large retardance in the lens center, and falling off radially. Conversely, a diverging electro-optic lens has maximum retardance at the perimeter and minimum at the center.

Several references disclose methods of pre-tilt and head-on birefringence control and various optical devices that utilizes the methods, see for example, R. A. Kikmet and C. de Witz, "Gel Layers For Inducing Adjustable Pre-tilt Angles In Liquid Crystal Systems," J. Appl. Phys., Vol. 20, No. 3, 1991, pp. 1265-1269; S. Masuda, T. Nose and S. Sato, "Optical Properties of a UV-Cured Liquid Crystal Microlens Array," Applied Optics, Vol. 37, No. 11, 1998, pp. 2067-2073; H. Ren and S.-T. Wu, "Tunable Electronic Lens Using a Gradient Polymer Network Liquid Crystal," Appl. Phys. Lett., Vol. 82, No. 1, 2003, pp. 22-24; and H. Ren, Y.-H. Fan, S. Gauza and S.-T. Wu, "Turnable Microlens Array Using Polymer Network Liquid Crystal," Opt. Commun., Vol. 230, 2004, pp. 267-271; and R. A. Kikmet and C. de Witz, "Gel Layers For Inducing Adjustable Pre-tilt Angles In Liquid Crystal Systems," J. Appl. Phys., Vol. 20, No. 3, 1991, pp. 1265-1269.

SUMMARY OF THE PRESENT INVENTION

It is an object of the present invention to provide the liquid crystal-based devices, namely cells and lenses having a specified resulting pre-tilt of the liquid crystal layer directly adjacent to the alignment layer of the substrate.

A further object of the present invention is to provide a liquid crystal cell or lens having a gradient in the average index of refraction or head-on optical retardation in at least two or more areas of the cell or lens.

Another object of the present invention is to provide liquid crystal cells and lenses having a pre-tilt angle that can vary over the area of the lens. The pre-tilt angle can be varied by applying an electric field to the cells or lenses during the fabrication process that involves polymerization of one of the material components when the appropriate voltage is applied across the cell. As a result, the cells or lenses contain a phase map for altering the optical path difference (OPD) of an incoming wave.

Still another object of the present invention is to provide a liquid crystal cell with a low concentration of curable monomer, preferably light-curable monomer that allows for fabrication of a polymer network which provides low light scattering comparable to a pure liquid crystal cell.

Yet another object of the present invention is to provide a liquid crystal cell having a localized polymer network near the cell substrate that provides the pre-tilt angle of the liquid crystal molecules in the polymerized layers near the cell substrate.

Another object of the invention is to provide a method for controlling the tilt angle of liquid crystalline molecules in the vicinity of a substrate by applying a voltage across the cell and polymerizing a monomer, preferably utilizing light-induced polymerization.

A further object of the present invention is to provide a liquid crystal cell or lens with a specified spatial distribution of the molecular pre-tilt angle of the liquid crystal near the cell substrate made possible by providing a multiple-step process of monomer polymerization of the cell by irradiating portions of the cell using two or more different voltages resulting in the formation of structures with pre-tilt angles that vary across the cell.

Still a further object of the present invention is to provide the method for preparing cells, and cells having a specified spatial distribution of the molecular pre-tilt angle near the substrates utilizing a multiple-step process of monomer polymerization within the cell, wherein the cell is irradiated through one or more of a movable narrow slit, aperture or special light modulator.

In one aspect of the present invention, a liquid crystal device is disclosed, comprising at least two substantially transparent substrates and an electro-active liquid crystal material layer located between the substrates and comprising a liquid crystal material and a polymer network, wherein the polymer network is derived from monomers present in an amount of about 0.01 to about 2 parts per 100 parts by weight of the liquid crystal material, and wherein the device has a patterned optically transmissive area with at least a first area and a second area present adjacent at least one of the substrates and the liquid crystals in the two areas have different resulting pre-tilt angles.

In a further aspect of the present invention, a method for fabricating an electro-optic device is disclosed, comprising the steps of obtaining a liquid crystal cell comprising a first substrate, a second substrate, a liquid crystal material layer located between the substrates and comprising liquid crystal material and a plurality of polymerizable monomers in an amount from about 0.01 to about 2 parts per 100 parts by weight of the liquid crystal material, and an electrode layer operatively connected to each substrate; and applying first a voltage to the cell and simultaneously polymerizing at least two monomers in a first area of the cell to form a polymer network, causing the liquid crystal material in the first area to have a different resulting pre-tilt angle when compared to at least a second area of the cell.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Liquid crystal cells and lenses of the present invention are provided having a variable resulting pre-tilt angle and a gradient of head-on optical retardation. Utilized herein, the pre-tilt angle of the liquid crystal refers to the number of degrees that the liquid crystal molecules in the cell adjacent to the substrate deviate from the plane of the substrate when no electric field is present or applied to the cell. The term "resulting pre-tilt angle" means the pre-tilt angle of the liquid crystal material after the polymer network has been formed. The methods of the present invention provide liquid crystal cells and lenses having a variable pre-tilt across two or more areas of the cell. In one embodiment, the methods of the present invention allow for manufacturing of cells and lenses with a substantially continuous change of angle of inclination for the liquid crystal molecules adjacent to the liquid crystal cell substrates, the liquid crystal pre-tilt angle or a pre-tilt. According to the methods of the invention, the magnitude of the resulting pre-tilt angle can be continuously varied from about 1° to about 90°, as a function of applied voltage during a polymerization process of monomers present in a composition located within the cell including the liquid crystal molecules. The liquid crystal pre-tilt angles can also be controlled locally, over a small area of the cell.

Figure 1:
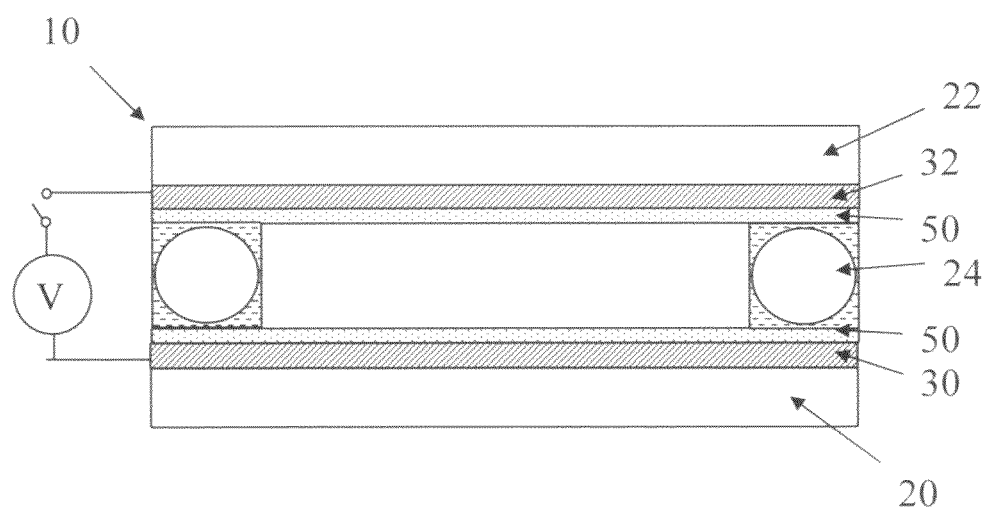
FIG. 1 is a cross-sectional view of one embodiment of an electro-optical device of the present invention.

Referring now to the drawings, FIG. 1 illustrates a cross-sectional view of one embodiment of an electro-optical device 10 of the present invention, generally a cell or lens. Device 10 includes a pair of substrates 20, 22, preferably planar and disposed parallel to each other. The substrates are maintained at a desired distance, for example by spacer 24 in a gasket in one embodiment as illustrated in FIG. 1. In one embodiment, the spacer layer has a thickness between about 5 and about 100 microns. Electrode layer 30 is present on a lower substrate 20 and an electrode layer 32 is present on the upper substrate 22. An alignment layer 50 is present on electrode layers 30 and 32 and a liquid crystal layer 60 is present between the substrates 20, 22 and in contact with alignment layers 50. As utilized herein, the term "layer" does not require a uniform thickness and imperfections or uneven thicknesses can be present so long as the layer performs its intended purpose.

Substrates 20, 22 provide a desired optical transmission through at least one area of the device and preferably are transparent or substantially transparent. Substrates 20, 22 can be planar or can be curved. Various materials can be utilized as known in the art, such as glass, quartz, or a polymer, or any combination thereof. The substrates are preferably non-birefringent, or aligned or compensated to minimize the effects of birefringence.

The conductive electrode layers 30, 32 can be deposited on a substrate by any known method. The electrode layer material can be any inorganic, substantially transparent conductive material. Examples of suitable materials include metal oxides such as indium oxide, tin oxide and indium tin oxide, and preferably indium tin oxide. In one embodiment, thickness of the conductive electrode layer is generally about 100 to 2,000 angstroms. The electrode layer must be sufficiently thick to provide desired conductivity. Resistivity of each of the conductive electrode layers can vary, and in one embodiment is generally from about 10 to about 1,000 ohms/sq and is preferably from about 10 to about 200 or 300 ohms/sq.

The alignment layer 50 is used to induce a particular directional orientation of the liquid crystal molecules before the formation of the polymer layers. Various materials suitable for use as alignment layers are known in the art, including, but not limited to, polyimide and polyvinyl alcohol. The thickness of the alignment layer 50 should be sufficient to impart the desired directional orientation to the liquid crystal material. Thickness of the alignment layer 50 in one embodiment is generally from about 100 to about 1,000 angstroms. As known in the art, the alignment layer 50 is treated by rubbing in some embodiments to impart a substantially homogeneous molecular orientation to the liquid crystal material prior to an electrical field being applied to the material. In one embodiment, the alignment layer is rubbed, such as with a velvet fabric, by hand, by using a rotating drum, a moving platform, or other mechanical rubbing technique for example. In one embodiment, the alignment layer is spin-coated, subsequently dried and cured as known by those of ordinary skill in the art.

Generally any liquid crystal material that has an orientational order that can be controlled in the presence of an electric field can be utilized, including any nematic, smectic or cholesteric phase forming liquid crystals, or polymer-containing liquid crystals such as polymer liquid crystals, polymer dispersed liquid crystals or polymer stabilized liquid crystals. Nematic liquid crystals are preferred in one embodiment. Desirable characteristics possessed by suitable liquid crystal materials include the ability to align the liquid crystal without much difficulty, rapid switching time, and a low voltage threshold. Non-limiting examples of liquid crystals that can be used in the present invention include 4-n-pentyl-4'-cyanobiphenyl (5CB), MLC 6080 available in Merck, Cambridge, Mass., and LC 18349 also available from Merck, or any other nematic LC materials designed for liquid crystalline devices.

As indicated herein, the liquid crystal layer also includes a polymer network formed from polymerizable monomers, preferably light or UV polymerizable monomers. Suitable monomers include generally any monomer polymerizable in the presence of the liquid crystal material utilized and generally an initiator, i.e., a photoinitiator in the case of a light or UV-curable monomer. The UV reaction is a polymerization reaction wherein crosslinking between the polymer chains is also possible. Examples of suitable polymerizable monomers include, but are not limited to, reactive mesogens, for example having polymerizable functional groups, including but not limited to acrylate groups. Polymerizable monomers are available from EM Industries as the RM product line, for example, RM 82, RM 84, and RM157. An example of a suitable monomer is RM 84 (BAB) available from EM Industries, a subsidiary of Merck. The polymerizable monomers and/or polymerized, cured monomers are present in the liquid crystal layer in an amount generally from about 0.01 to about 2.0 parts, desirably from about 0.1 to about 1 part and preferably from about 0.25 to about 0.75 part by weight based on 100 total parts by weight of the liquid crystal material.

Any suitable initiator known to those of ordinary skill in the art may be utilized in the present invention. For example, in one embodiment a photoinitiator, such as Irgacure® 651 available from Ciba is utilized. The amount of initiator utilized is sufficient to provide the desired level of polymerization of the monomer and can vary depending upon the initiator and/or monomer selected. In one embodiment, the amount of initiator ranges generally from about 1 to about 5 parts and preferably from about 2 to about 3 parts by weight per 100 parts by weight of the polymerizable, i.e. curable monomer, such as RM 84.

Once the device 10 is assembled, preferably with the alignment layer in anti-parallel alignment of the rub directions, the cells are filled with a liquid crystal material layer, such as through a port in the spacer layer, generally a sealing gasket. After the cells are filled with the liquid crystal material mixture, electrodes are attached to the electrode layers 30 to allow voltage application across the device 10.

Utilizing the methods of the present invention, cells with a pre-tilt that is varied across two or more areas, i.e. at least a first area and a second area; or three or more areas, a first, second and third area, etc; of the cell can be manufactured. The methods of the present invention allow for fabrication of liquid crystal cells with any custom-design OPD profile and enable manufacturing of various liquid crystalline optical elements as well as further improvement of optical properties of liquid crystal displays. The liquid crystal material layer composition allows for the formation of a low-density polymer network near the cell substrates that stabilizes the liquid crystal orientation near the cell substrates. The indirect evidence in some embodiments is believed to point to the localization of the polymer network within one micron or less from the substrate in the fact that the cells after polymerization demonstrate the electro-optical properties substantially the same as the regular planar LC cells with high pre-tilt angles. By fitting the transmission vs. angle curves in the crystal rotation method for some embodiments it has been roughly estimated that the thickness of the polymer layer is from several microns to a fraction of a micron. The method allows for fabrication of liquid crystal cells and devices that demonstrate very low light scattering, which is comparable to liquid crystal cells without a polymer network, such as through a visual comparison.

It has been found that by applying a voltage across the liquid crystal cell before starting the final polymerization process, the light scattering in the device is significantly reduced. After an optional, initial voltage application step, a final polymerization process takes place at a pre-determined voltage level, using a light source, such as visible light and/or an ultra-violet light source. Not only UV light can be used, because there are photoinitiators that react to various wavelengths of light, including visible.

When the polymerization voltage is applied across the liquid crystal cell, the permanent and induced dipoles of liquid crystal molecules experience a dielectric torque and tend to align along the electric field. The liquid crystal director, which indicates the prevailing orientation of the long molecular axes, is now subject to elastic and electric torques that produce an equilibrium director distribution within the cell. As a result, the liquid crystal molecules near the substrate overcome a continuous splay. The splay director configuration is then fixed in place as a result of the formation of the polymer network near the substrates. The average inclination angle for the liquid crystal molecules near the substrates then exceeds the original pre-tilt angle and is determined by polymerization voltage: the higher the polymerization voltage, the higher the average inclination angle. Since the polymer network is formed only in the vicinity of the cell substrates, holding the liquid crystal molecules at higher average inclination angle via the formation of the polymer network is equivalent to changing the original pre-tilt angle of the cell.

Thus, when all applied voltages are removed, we end up with a cell that features a permanent pre-tilt angle that is higher than the original pre-tilt angle prior to polymerization at the desired voltage. As a result, the head-on optical retardation of the finished cell depends on the applied voltage and the alignment of the liquid crystal molecules during the polymerization process. The fabricated polymer network keeps the liquid crystal molecules at high and controllable angles near the cell substrates and, at the same time, allows for molecular re-orientation in the bulk if an external electric field is applied. Contrary to the present technology, this method provides for fabrication of liquid crystal optical elements with very low light scattering, comparable to the light scattering from liquid crystal cells without a polymer network.

Since the cells obtained as a result of application of this method show optical properties similar to cells with high pre-tilt angles, the developed technique allows fabrication of the liquid crystal cells with any desirable pre-tilt angle in the range of 1° to 90° with respect to the cell substrate. Because the formation of the polymer network occurs only at the areas that are under the light irradiation, cells that have a different head-on optical retardation in different regions of the cell can be created; thus, gradients in the optical retardation can be established in the cell.

The developed technique thereby allows a continuous and controllable change in the cell's pre-tilt, and hence, the head-on birefringence, and, thus, gives a new method of fabrication of liquid crystalline optical elements with large apertures and big working areas. Thus, lenses with extremely aspheric or irregular phase patterns can be constructed without grinding, free-forming or the use of other complex methods of lens fabrication. Moreover, the complex step of photo-lithography to form intricate electrode structures is eliminated. The developed technique can be also used in other liquid crystalline devices, where high pre-tilts are required for the optimum performance, for example, twisted (TN) and super-twisted (STN) nematic and cholesteric displays and switches and liquid crystal display modes that utilize bend (Pi-cell) and vertical alignment modes.

Advantages of the present invention include the following points: (1) the usage of low concentration of the polymerizable monomer, for example UV-curable monomer allows for fabrication of a polymer network, which results in very low light scattering comparable to the pure liquid crystal; (2) localization of the polymer network near the cell substrate wall allows for control of the tilt angle of the liquid crystal molecules in the polymerized layers located in the thin layer near the substrates; (3) control of the tilt angle of the liquid crystalline molecules in the vicinity of the substrates is achieved by voltage application across the cell during the light-induced polymerization; this allows for fabrication of cells with a specified average tilt of the optic axis; the effect is equivalent to changing a pre-tilt angle in the original cell; (4) fabrication of cells or devices with a specified spatial distribution of the molecular pre-tilt angle near the substrates becomes possible through a multiple-step tilt-angle setting and polymerization; the cell is irradiated through a movable narrow slit or an aperture when a voltage is applied to the cell; the applied voltage is changed as the previously unexposed areas of the cell are subjected to light irradiation resulting in the formation of the structures with pre-tilt angles that vary across the cell or device; the achieved spatial distribution of the molecular pre-tilt angle allows or provides a substantially continuous change in head-on optical retardation across the cell or device; and (5) fabrication of the cells or devices with specified spatial distribution of the molecular pre-tilt angle near the substrates becomes possible through a multiple-step process of polymerization: a high voltage is applied to the cell to cause the migration of the monomer; then a low voltage is applied to the cell and specific designated regions or areas of the cell are irradiated using a spatial light modulator light source to polymerize in those regions; the applied voltage is changed and previously unexposed areas of the cell are subjected to light irradiation resulting in the formation of the structures with pre-tilt angles that vary across the cell; the achieved spatial distribution of the molecular pre-tilt angle allows continuous change in head-on optical retardation across the cell.

In summary, the technique can be used to produce lenses or devices with spherical power, cylindrical power, spherical aberration, prism, or any arbitrary non-planar wavefront, limited only by the resolution that can be achieved in the photo-patterning process.

The following steps can be utilized to form a desired polymer network. In a first step, an initial, pre-polymerization voltage is applied across the cell for a period of time. The voltage range is generally from about 0 to break-down voltage, which is individual to each cell and material, and usually higher then 100 V per 20 microns of cell thickness, desirably from about 10 V to about 100 V and preferably is about 100 volts. The higher the voltage, the more effective separation of the mixture and the shorter the pre-polymerization stage. The time of the initial voltage application ranges generally from about 1 second to about 1 minute, and preferably is about 3 seconds. It is believed the application of the high voltage initiates movement of the polymerizable monomer closer to the substrate. The pre-polymerization application of voltage may be omitted. However, it is preferred as it provides for lower light scattering in the finished cell and helps to localize the polymer network closer to the cell substrate. In some embodiments, it is advantageous to simultaneously apply low-intensity UV radiation or radiation from another light source to the cell during this pre-polymerization "monomer migration" step to achieve some limited small-chain polymerization of the monomer. This step can be performed over the entire area of the cell prior to polymerization or, alternatively, it may be performed over a small area, the area such as been cured, and the process repeated over other areas until the desired area of the lens is polymerized.

To form the polymer network, voltage across the cell is changed, if applied in a pre-polymerization step. Voltage is applied during each individual polymerization step, independently, ranges generally from about 0 V to break-down voltage, and depends on liquid crystal material, concentration of monomer, and cell thickness. In one embodiment, the cell is irradiated with a radiation source such as visible light or UV light, for example a high intensity UV light, ranging from about 1 to about 50 mW/cm$^2$ in both UVA and UVB spectra. The radiation can be initiated on one or both sides of the cell, preferably through a mask including a slit or a diaphragm in a variable size. UV curing spot lamps coupled with an optical slit are utilized in some embodiments. The lamp emits in UVA and UVB diapasons. In this step, the UV light-induced crosslinking of the monomer can occur both in the vicinity of the electrodes and in the bulk of the cell.

The applied voltage is then dropped to zero and the radiation or light source, such as UV light is turned off. The cell and/or light source is moved so that another portion of the cell can be subjected to the polymerization process, if desired.

As a result of the process, the irradiated areas possess lower head-on optical retardation when compared to portions of the cell that were not exposed to a radiation source, such as ultraviolet light.

Examples of various applications of the method and devices in the application are presented hereinbelow.

Photo-polymerization-induced phase separation in liquid crystal mixtures containing photo-reactive monomers was studied extensively in their application to polymer-dispersed liquid crystals, where the micron-size LC droplets formed in the polymer matrix, first reported by W. Doane, N. A Vaz, B.-G. Wu, and S. Zumer, Appl. Phys. Lett. 48 p. 269 (1986). In the majority of cases, the polymer network occurs in the bulk, however, in certain cases localization of the polymer at various cell sites was observed. Motion of the monomer toward the substrates was observed previously, for example, by M. Y. Jin, T. H. Lee, J-W. Jung, and J. H. Kim "Surface effects on polymerization induced anisotropic phase separation in liquid crystal and polymer composites", Appl. Phys. Lett. 90, 193510 (2007) and used by S. G. Kim, S. M. Kim, Y. S. Kim, H. K. Lee, S. H. Lee, G. D. Lee, J. J. Lyu, and K. H. Kin "Stabilization of the liquid crystal director in the patterned vertical alignment mode through formation of pre-tilt angle by reactive mesogen" Appl. Phys. Lett. 90, 261910 (2007), T. J. Chen and K. L. Chu "Pre-tilt angle control for single-cell-gap transflective liquid crystal cells" Appl. Phys. Lett. 92, 091102 (2008) to stabilize the LC molecular orientation near the substrates. Authors observed the accumulation of the polymer predominantly near the substrate that faced the UV source and lesser accumulation near the opposite surface. The experimental results were accompanied by modeling. Modeling was based on Flory-Huggins theory. Surface effects were accounted for by introducing the potential energy of interaction of each molecular species with the surface which decays exponentially as a function of distance from the surface. Relative polymerization and UV absorption length were adjusted according to experimental data. Modeling has shown that the photo-polymerization occurs in the vicinity of the substrate facing the UV light source. However, if the alignment surface prefers prepolymer to LC molecules, two processes may compete, and the polymer may accumulate at both substrates.

Other authors studied the motion of polymer particles in liquid crystal in the presence of the electric field applied across the cell. In two separate works by Y. Kim, J. Francl, B. Taheri, and J. West "A method for the formation of polymer walls in liquid crystal/polymer mixtures" Appl. Phys. Lett. 72(18), 2253-2255(198) and by R. Ren, S.-T. Wu, and Y.-H. Lin "In situ observation of fringing-field-induced phase separation in a liquid-crystal-monomer mixture" Phys. Rev. Lett. 100, 117801 (2008) relatively large polymer particles were segregated at the regions with weaker electric fields, whereas liquid crystal was pushed toward the regions with strong electric field. Because the dielectric constant of the liquid crystal is higher than for the photoreactive monomer, they suggested that a diaphoretic force acting on polarized dielectric particles in electric field gradients is responsible for the phase separation. Yet another mechanism of phase separation was proposed by D. Voloschenko, O. Pishnyak, S. Shiyanovskii, and O. Lavrentovich "Effect of director distortion on morphologies of phase separation in liquid crystal" Phys. Rev. E 65, 060701 (R), who demonstrated that the LC director field can influence the phase separation: regions with strongest distortions attract small polymer particles.

As evident from this short review, there are several competing micro- and macro-processes that drive the phase separation and lead to the resultant polymer distribution within the liquid crystal cell. At the stage when the monomer is uniformly dispersed in liquid crystal, mixing of the two species of molecules is favored over the phase separation, however, as polymerization process progresses, the longer polymer chains become immiscible with polymer. In the phenomenological mean-field Flory-Higgins theory, which often used to describe phase separation in polymer melts, there are two entropy terms that favor mixing of low molecular weight components and the enthalpy term that takes into account interaction between molecules of the same species and molecules of different species. This accounts for the fact that mixing of the molecules with different number of chains, in our case low-molecular-weight liquid crystal and long polymer chains, is much harder than of the molecules with comparable degrees of polymerization. As polymerization progresses, the entropy of mixing of the polymer component decreases due to the fact that the monomers become connected into the chain, and thus cannot mix freely in the solution. From these considerations one can understand why phase separation may occur predominantly near the cell substrate facing the UV light source. As the light intensity falls exponentially with the cell thickness due to light absorption and scattering, polymerization mostly occurs in the areas closer to the cell surface that faces the UV light source. Polymerization promotes separation of the monomer and the formation of the polymer network near the cell substrate. Wetting of the polyimide alignment layer by polymer facilitates collection of it not only at the surface facing the UV light source, but also at the opposite surface, which is observed in our experiments. This facilitates the formation of stable and uniformly aligned liquid crystalline planar structures with various pre-tilt angles that are fixed at both substrates. Since we used very low concentration of photo-polymerizable monomer, the formation of a continuous polymer film or polymer droplets was not observed. Thus, macroscopic mechanisms, such as fringe-field-induced phase separation proposed by R. Ren, S.-T. Wu, and Y.-H. Lin or accumulation of polymer particles in the regions with the strongest director distortions observed by O. D. Lavrentovich's group, cannot be applied in our case. However, the Flory-Higgins theory can be further modified taking into account an orientational ordering of liquid crystals (see, for example, V. Popa-Nita and S. Kralj "Random anisotropy nematic model: Nematic-non-nematic mixture" Phys. Rev. E 73, 041705 (2006) and A. Matsuyama and R. Hirashima "Phase separation in liquid crystal-colloid mixtures" J. of. Chem. Phys. 128, 044907 (2008)). These works show that the orientational ordering of liquid crystal increases the phase separation tendency. In the well-studied guest-host effect (T. J. Scheffer *Philosophical Transactions of the Royal Society of London. Series A, Mathematical and Physical Sciences*, Vol. 309, No. 1507, pp. 189-201) non-liquid-crystalline molecules (added to liquid crystal in small amounts) align preferably along the director. Similar effect was observed by us, when we observed the residual birefringence consistent with the alignment of polymer chains in the polymerized cells that were heated above the nematic-isotropic phase transition temperature.

Example 1

In this example, fabrication of uniform samples with a specified head-on optical retardation is shown, which is equivalent to increasing a pre-tilt angle. The liquid crystal cell is fabricated according to the cell fabrication procedure described. The cells have cell gaps of about d=20-21 μm. In this example, PI 2555 was used as an alignment layer. The cells were filled with a mixture of MLC 6080 (by EM Industries), about 0.5% BAB monomer and about 0.005% of Irgacure (by weight). The MLC 6080 material has the following characteristics:

Refractive indices (at $\lambda$=589 nm): $n_o$=1.5076, $n_e$=1.71, $\Delta n$=0.2024

Dielectric constants: $\epsilon_{parallel}$=11.1, $\epsilon_{perpendicular}$=3.9, $\Delta\epsilon$=7.2.

The fluid demonstrated a pre-tilt angle of 2° on the polyimide alignment layer PI 2555 from DuPont.

The cells were irradiated with UV light from one cell side for about 30 minutes at the following power densities: 0.007 W/cm² in UVA UVB (combined). AC voltage of 2, 10, 20, 30, 50, and 100 V rms of 200 Hz were applied across the cells during the UV light-induced polymerization. After polymerization was complete, the cells demonstrated different head-on optical birefringence. The resultant head-on optical retardation was estimated by measuring the cell transmission as a function of the applied voltage (a T-V curve). In order to measure the T-V curve, the cell was placed between two crossed polarizers with rub directions making a 45° angle with respect to the transmission axes of the polarizers. Light from a white LED equipped with an interference filter, that allowed the transmission of light with $\lambda$=546 nm, was incident on the system. The transmitted light was measured with a photodiode connected to a Keithley Instruments multimeter. The set-up was automatically controlled by a personal computer. The T-V curves at the normal incidence of the laser beam were measured. Peaks on the curves correspond to maximum cell transmission, when an optical retardation $\Delta nd$ (due to the liquid crystal cell) is equal to an integer number of wavelength $\lambda$: $\Delta nd = n\lambda$, n=1, 2, 3, .... Here $\Delta n = n_{eff} - n_o$, where $n_o$ is the refractive index for the ordinary wave normal, $n_{eff}$ is the refractive index for the extra-ordinary wave normal; $n_{eff}$ varies according to the direction of propagation inside the liquid crystal between the limits $n_o$ and $n_e$ and is given by $n_{eff} = n_o n_e / \sqrt{n_o^2 \sin^2\theta + n_e^2 \cos^2\theta}$, where $\theta$ is the angle between the optic axis and the direction of propagation of the e-wave normal inside the crystal.

Figure 5:
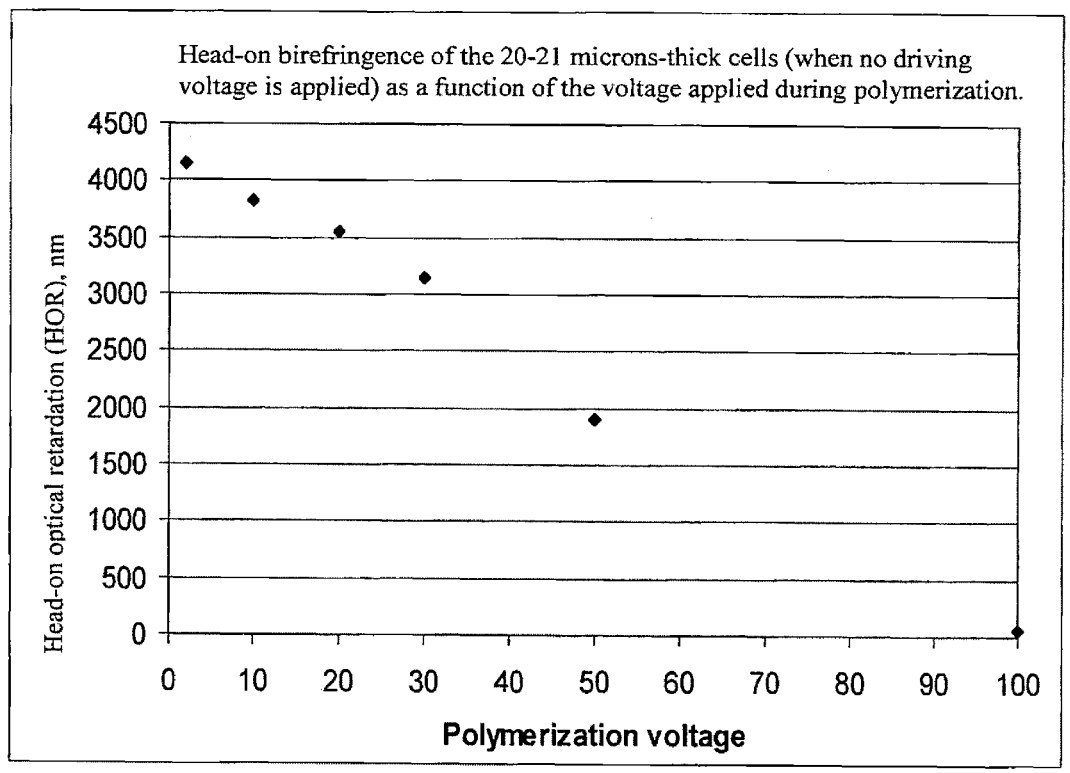
FIG. 5 is a chart estimating the head-on optical retardation as a function of the voltage that was applied to the cells during the curing process for a mixture of MLC 6080 and 0.5% by weight of BAB monomer.

By counting the number of peaks on the T-V curves, the cell's head-on optical retardation (HOR), given by $$\int_{-d/2}^{d/2} \Delta n \, dz, \text{ with}$$

$$\Delta n = n_{eff} - n_o = \frac{n_o n_e}{\sqrt{n_o^2 \sin^2\theta + n_e^2 \cos^2\theta}} - n_o,$$

and the z-axis normal to the cell substrates, with the accuracy of about $\lambda/4$ can be estimated. FIG. 5 shows the measured HOR as a function of voltage applied during polymerization. As evident from the experimental data, HOR can be decreased from its initial value to almost zero. Thus, the method allows for continuous change of the direction of the average optic axis, with respect to the cell substrate, and hence a pre-tilt angle, from several degrees to almost 90° that corresponds to homeotropic alignment of molecules, with any specified angle in between.

Figure 6:
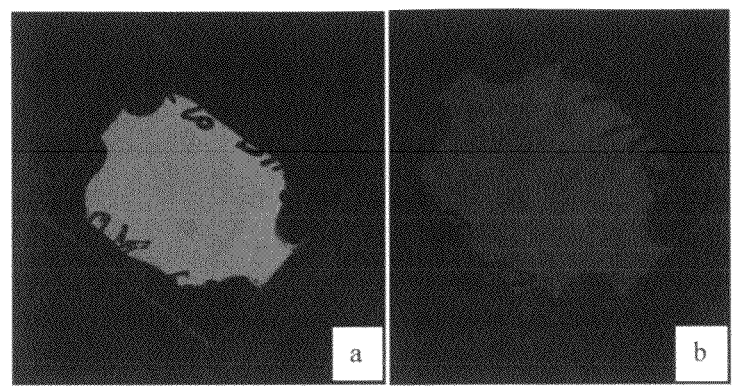
FIG. 6 shows photographs of cells (a) and (b) filled with a mixture of MLC 6080 and 0.5% by weight of BAB monomer and polarizers polymerized at different voltages, (a) at 20 V and (b) at 50 V.

FIG. 6 shows photos of the actual cells polymerized at two different voltages and placed between crossed polarizers with rub directions at 45° with respect to the transmission axes of the polarizers: different interference colors of the cells indicate different HOR, and thus, different pre-tilt angles.

After polymerization is complete, the resultant cell can be switched to even lower HOR, and can be used in various liquid crystalline devices, such as displays, shutters, switches and windows, in the same manner as high-pre-tilt liquid crystal devices.

Figure 7:
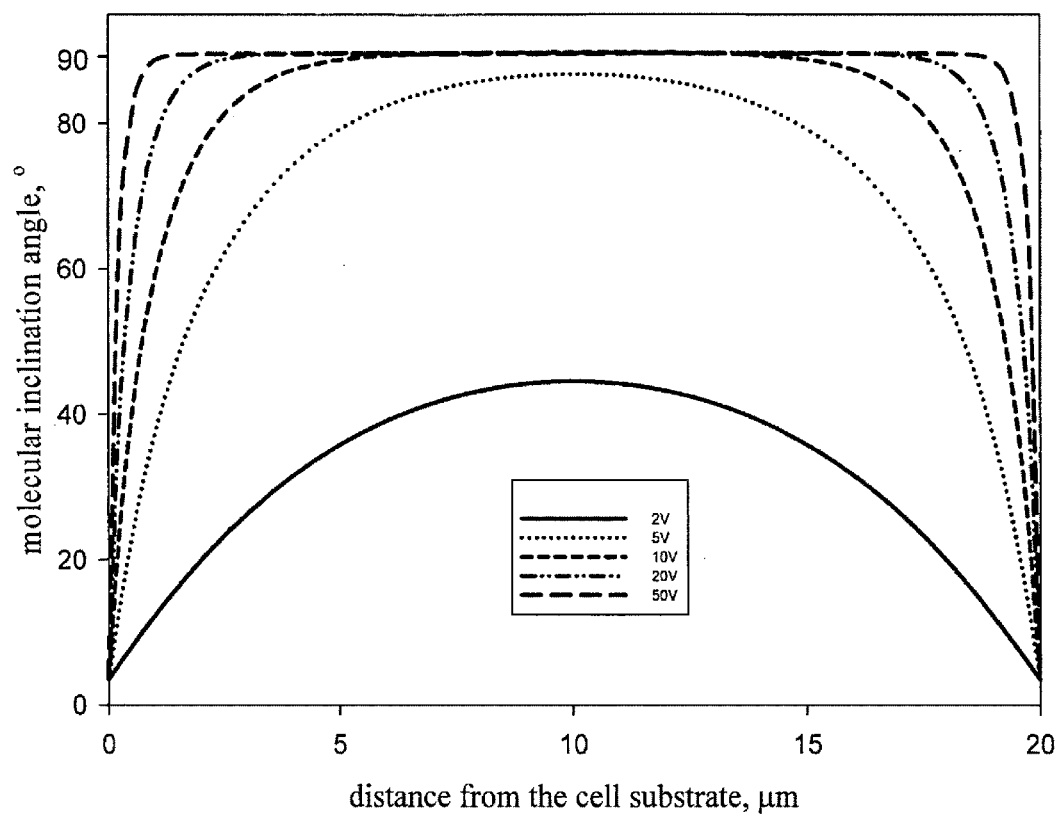
FIG. 7 is a graph illustrating calculated molecular inclination angle (with respect to the cell substrate) as a function of the distance from one of the cell substrates when a voltage of 2, 5, 10, 20 and 50 V is applied across a planar LC cell filled with MLC 6080.
Figure 8:
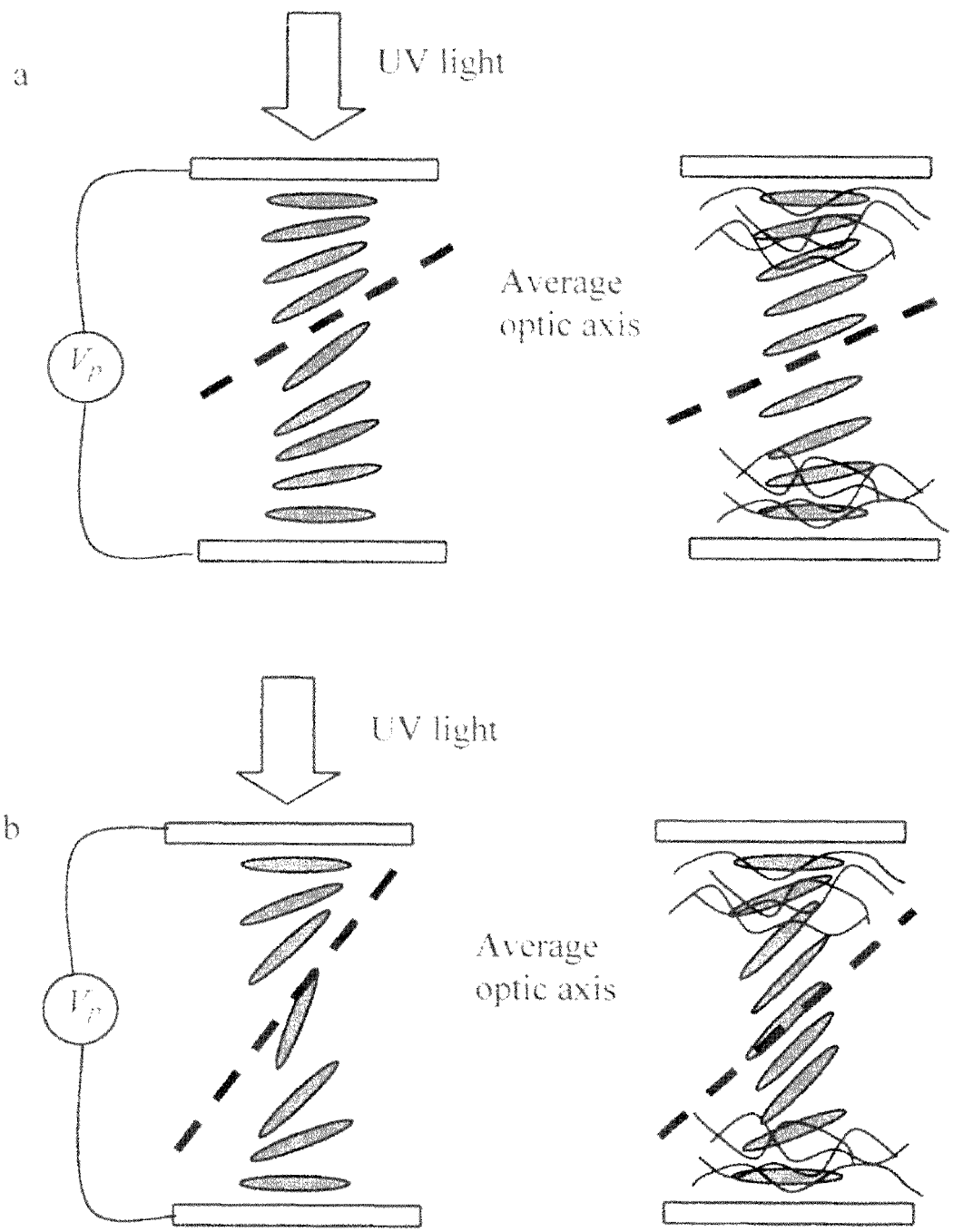
FIG. 8 illustrates the LC molecular distribution when a high voltage is applied during the UV light-induced polymerization and the resultant distribution when low (a) and high (b) $V_p$ is applied across the cell during polymerization.

The following is an explanation of the physical processes that took place during UV light polymerization. When voltage is applied during polymerization, it causes movement of monomer closer to the cell substrates. Polymerization and cross-linking of the BAB monomer provided for the formation of a polymer network that is localized near the cell substrates. The result was the formation of the polymer network that fixes the liquid crystal director near the substrates. When voltage $V_p$ above the Friedericksz's transition threshold is applied across a LC cell, the director configuration is a result of the balance of the elastic and dielectric torques and is subject to strong boundary conditions. FIG. 7 shows the equilibrium director configuration at different applied voltages in a planar cell filled with MLC 6080. The calculations of the equilibrium director configuration were based on the Frank-Oseen theory. The Euler-Lagrange formalism was used to obtain the equations of motion. We used standard relaxation techniques to solve them numerically. Modeling was performed by using Twist Cell Optics software [Twist Cell Optics 7.2 software developed at Liquid Crystal Institute, Kent State University, Kent, Ohio, USA]. As seen from FIG. 7, the director distribution in the vicinity of the cell substrates overcame a continuous splay. The range of the splay angles for the given thickness of the LC layer in the vicinity of the boundary depends on voltage $V_p$. For example, when $V_p$=2V, the molecular tilt angle changes in the range from 3.5° (the pre-tilt angle) to about 15° within the thickness of 1 μm, whereas at $V_p$=50V the director configuration changes from the planar to homeotropic orientation within the same 1-μm thick sub-layer (FIG. 7). We argue that as a result of the application of our polymerization technique, this director configuration was "frozen" in place in the thin layer in the vicinity of the cell substrates. After polymerization was complete, the near-substrate regions provided for the anchoring of the LC molecules in the bulk. The average inclination angle for the LC director in the bulk of the cell was determined by the molecular inclination angle at the boundary of the polymerized layer (FIG. 8), making the director configuration equivalent to one for a planar cell with a high α. When voltage across the cell was decreased to zero, the near-substrate regions that feature high molecular tilt, provided for anchoring of the liquid crystal molecules in the bulk, effectively providing the formation of liquid crystal structures that were equivalent to planar cells with high pre-tilt angles. Thus, the developed method allowed for a continuous change of a pre-tilt angle achieved by application of appropriate voltage during polymerization.

Example 2

In this example, uniform samples with a specified pre-tilt angle were fabricated by building symmetric liquid crystal structures. This was achieved by illuminating the liquid crystal cells from two cell sides.

Figure 9:
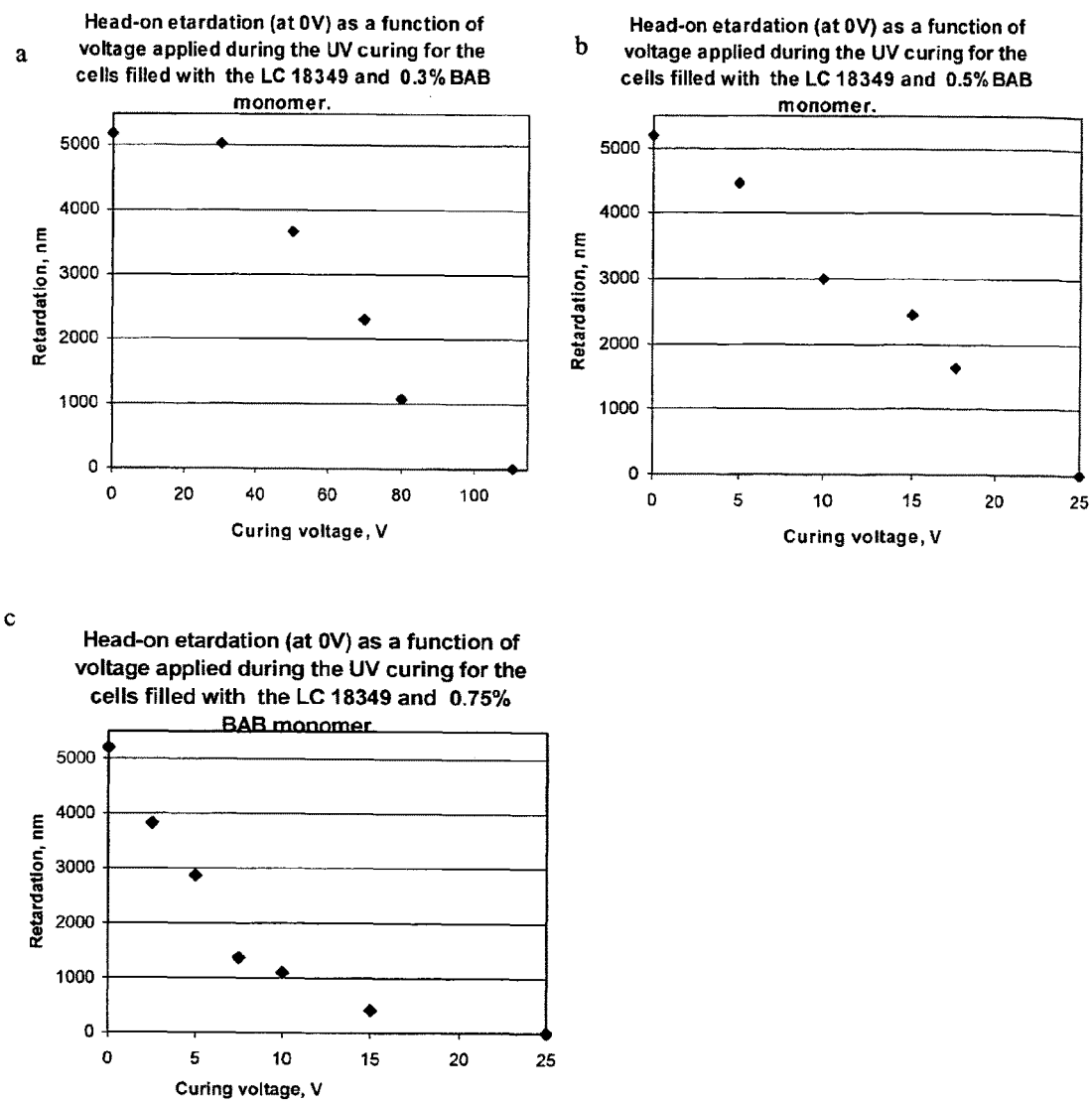
FIG. 9 illustrates graphs (a), (b) and (c) with head-on retardation as a function of the voltage applied during UV curing for cells filled with liquid crystal 18349 and with (a) 0.3%, (b) 0.5% and (c) 0.75% by weight of BAB monomer.

Liquid crystal cells were fabricated according to the procedure described earlier. The cells had a gap of d=20-21 μm and utilized KPI from IDW Company as an alignment layer. The cells were filled with mixtures of MLC 18349 from EM Industries, and 0.3, 0.5%, and 0.7% BAB monomer (by weight). The MLC 18349 has $n_e-n_o=\Delta n=0.26$ and demonstrated a pre-tilt angle of about 3° on KPI. The cells were irradiated for about 20 minutes from two cell sides using two identical UV lamps facing each other, each having a UV power density of about 0.007 W/cm² at each cell side. Irradiation from two cell sides was achieved by placing the UV lamps head-to-head on opposite cell sides. Resultant HOR, after the UV curing, was estimated according to the method described in Example 1. FIG. 9a-c shows measured HOR as a function of voltage applied during polymerization for three types of cells filled with mixtures having 0.3, 0.5, and 0.7% of BAB, respectively. As expected, the HOR depends on concentration of the BAB monomer in the mixture; cells filled with the mixture having low concentration of BAB require high voltages applied during polymerization to achieve the same level of the HOR. For example, cells with 0.3% of BAB required about 80 V applied during polymerization to achieve the HOR of about 1000 nm, while the cells filled with 0.5% and 0.7% of BAB required only about 22 V and 10 V, respectively. However, increasing the BAB concentration higher than about 1% or 2% is not recommended because the cells with high BAB concentration showed relatively high light scattering.

Cells described in Examples 1 and 2 maintained the developed HOR and, thus, the high pre-tilt angle, for more than a year, starting from the first experiments and showed the same stable alignment of liquid crystal molecules for a much longer time.

Example 3

In this example, the director distribution was examined in the cells with anti-parallel rub (ECB cells) that had cell gaps of d=20.2±0.2 μm (measured when the cells were empty). The cells were filled with a mixture of MLC 6080 and 0.5% BAB monomer (by weight).

MLC-6080

Refractive indices (at λ=589 nm): $n_o$=1.5076, $n_e$=1.71, $\Delta n$=0.2024

Dielectric constants: $\epsilon_{parallel}$=11.1, $\epsilon_{perpendicular}$=3.9, $\Delta \epsilon$=7.2.

Elastic constants: $K_{11}$=14.4*10⁻¹² J/m, $K_{22}$=7.1*10⁻¹² J/m, $K_{33}$=19.1/10⁻¹² J/m.

Rotational viscosity: $\gamma_1 = -\alpha_2$=111 cp.

The fluid demonstrates a pre-tilt angle of α=2-3.5° on the polyimide alignment layer PI 2555 (by Nissan Chemicals) (In modeling, α=3.5° was used).

The alignment layer used for fabrication of these cells was PI 2555 from DuPont. The cells were exposed to UV light by using two identical UV lamps (see description of the UV light source above). The cells were irradiated from two sides, with two light sources facing each other. Optical power at the irradiated surfaces was 15 mW/cm². Before the UV curing process started, high voltage of about 100V (AC, frequency 1 kHz) was applied across the cell for 3-10 minutes during a pre-polymerization step. The application of high voltage before curing induced the movement of the monomer closer to the substrates. After high-voltage application, a process of polymerization was initiated at the lower voltage. The cells were polymerized at various voltages, ranging from 10 to 100 V. The cells were UV polymerized for about 30 minutes at a specified voltage.

In the data analysis, it was assumed that cells which are irradiated from both sides feature a symmetric director distribution after curing, and, thus, had the same pre-tilt angles at both substrates.

The following are the results of measurements and modeling that provided the numerical values of pre-tilt angles achieved as a result of voltage application during UV light irradiation.

Figure 10:
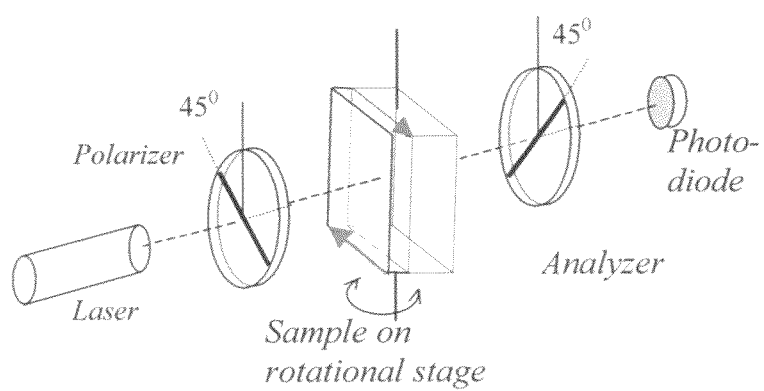
FIG. 10 is a schematic of a measurement set-up for a crystal rotation method.

In order to estimate the pre-tilt angle for irradiated cells, the transmission versus incidence angle curves were measured by using a standard crystal rotation method, see FIG. 10. We used light of a He—Ne-ion laser ($\lambda$=630 nm) in the measurements. According to this method, two crossed polarizers were kept stationary, with the transmission axes at 45° with respect to horizontal. A liquid crystal cell was rotated around its axis, which changes the incidence angle of the testing beam. The resultant transmission through the system depends on a phase shift between the ordinary and extraordinary waves, as they propagate at various incidence angles in the sample. These curves were measured and analyzed for two different sample orientations, with the rub directions along horizontal and along vertical.

Measured curves were compared with the results of modeling. The optical retardation for a light beam passing through the cell at the angle of incidence i was expressed by $\delta=(2\pi d/\lambda) f(\alpha, i)$, where d was the thickness of the LC layer and $f(\alpha, i)$ was a function of the pre-tilt angle $\alpha$ and the angle of incidence i. With the configuration of FIG. 1, the transmittance became $T(i)=(\frac{1}{2})\sin^2(\delta/2)$. Since the Snell's law was applicable for both ordinary (o-) and for extraordinary (e-) wave normal, the function $f(\alpha, i)$ could be calculated analytically. The refractive index for the e-wave normal varies according to the direction of propagation inside the liquid crystal between the limits $n_o$ and $n_e$. If $\theta$ was the angle between the optic axis and the direction of propagation of the e-wave normal inside the crystal, the refractive index $n_{\mathit{eff}}$ for it was given by $$n_{\mathit{eff}} = n_o n_e / \sqrt{n_o^2 \sin^2\theta + n_e^2 \cos^2\theta}$$

Figure 11:
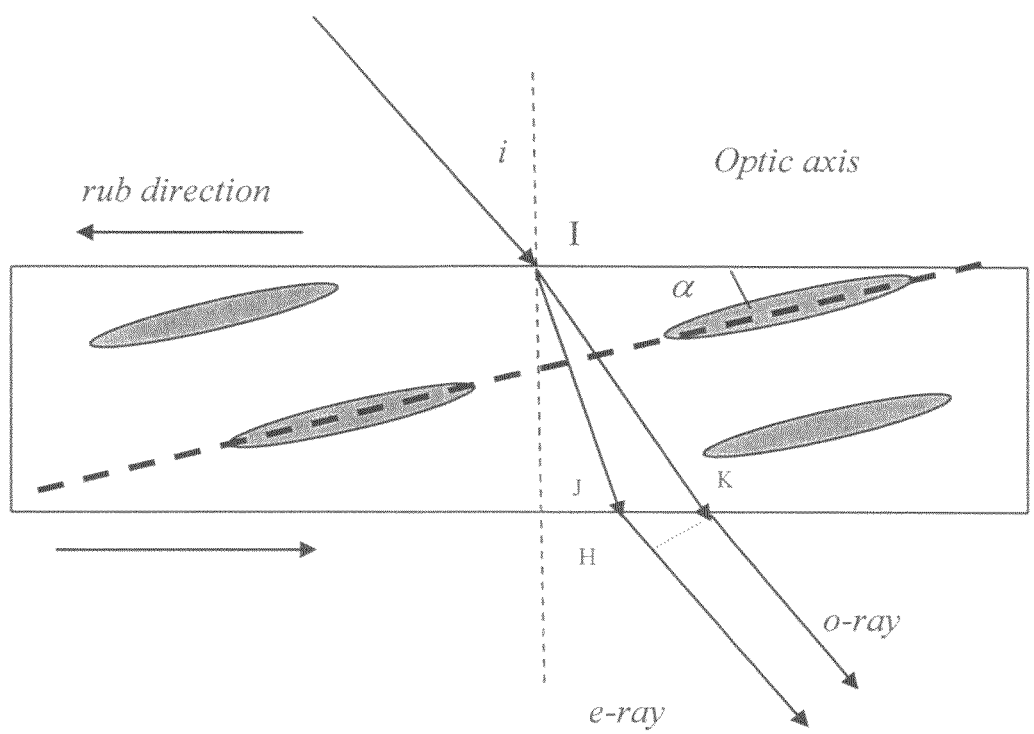
FIG. 11 illustrates the geometry for calculating the path difference between e- and o-rays.

Path difference between e- and o-rays is given by $\Delta = n_{\mathit{eff}}$ (IJ)+(JH)$-n_o$(IK), see FIG. 11. Phase function $f(\alpha, i)$ depends on the angle between the plane of incidence and the principal section containing the optic axis $\omega$. In the case when the plane of incidence coincides with the principal section ($\omega$=0) and the optic axis and the refracted beams are on the same side with regard to the normal to the sample, the phase function was given by:

$$f(\alpha, i) = n_o \sqrt{1 - \frac{\sin^2 i}{n_o^2}} - \frac{\left(\frac{1}{n_e^2} - \frac{1}{n_o^2}\right)\sin i \sin\alpha \cos\alpha}{\frac{\cos^2\alpha}{n_e^2} + \frac{\sin^2\alpha}{n_o^2}} - \frac{1}{\sqrt{\frac{\cos^2\alpha}{n_e^2} + \frac{\sin^2\alpha}{n_o^2}}} \sqrt{1 - \frac{\sin^2 i}{n_o^2 n_e^2 \left(\frac{\cos^2\alpha}{n_e^2} + \frac{\sin^2\alpha}{n_o^2}\right)}} \quad (2)$$

where $\alpha$ is the angle of inclination of the optic axis with respect to the cell substrates, see FIG. 11. If the optic axis and the refracted beams are at the opposite sides of the normal to the sample ($\omega$=$\pi$), then the phase function is given by:

$$f(\alpha, i) = n_o \sqrt{1 - \frac{\sin^2 i}{n_o^2}} + \frac{\left(\frac{1}{n_e^2} - \frac{1}{n_o^2}\right)\sin i \sin\alpha \cos\alpha}{\frac{\cos^2\alpha}{n_e^2} + \frac{\sin^2\alpha}{n_o^2}} - \frac{1}{\sqrt{\frac{\cos^2\alpha}{n_e^2} + \frac{\sin^2\alpha}{n_o^2}}} \sqrt{1 - \frac{\sin^2 i}{n_o^2 n_e^2 \left(\frac{\cos^2\alpha}{n_e^2} + \frac{\sin^2\alpha}{n_o^2}\right)}} \quad (3)$$

Expressions (1) and (2) gave the phase function for the case when the rub direction is along horizontal.

In the case when the plane of incidence is perpendicular to the principal section ($\omega$=$\pi$/2), the phase function is given by:

$$f(\alpha, i) = n_o \sqrt{1 - \frac{\sin^2 i}{n_o^2}} - \frac{1}{\sqrt{\frac{\cos^2\alpha}{n_e^2} + \frac{\sin^2\alpha}{n_o^2}}} \sqrt{1 - \frac{\sin^2 i}{n_e^2}} \quad (4)$$

Expression (4) gave the phase function for the case when the rub direction is along vertical.

Mathematica software was used to generate phase functions and transmission versus incidence angle curves for various director distributions. In the model, phase functions were calculated for a multi-layer structure with fixed $\alpha$ for each layer, see FIG. 12. The number of layers, as well as the angle $\alpha$ inside each layer, were adjusted to obtain the best fit of experimental curves. The overall thickness of the birefringent multi-layered structure was also adjusted but within a small range, from 19 to 19.5 microns. The refractive induces of MLC 6080, listed above, were used in the modeling.

Figure 12:
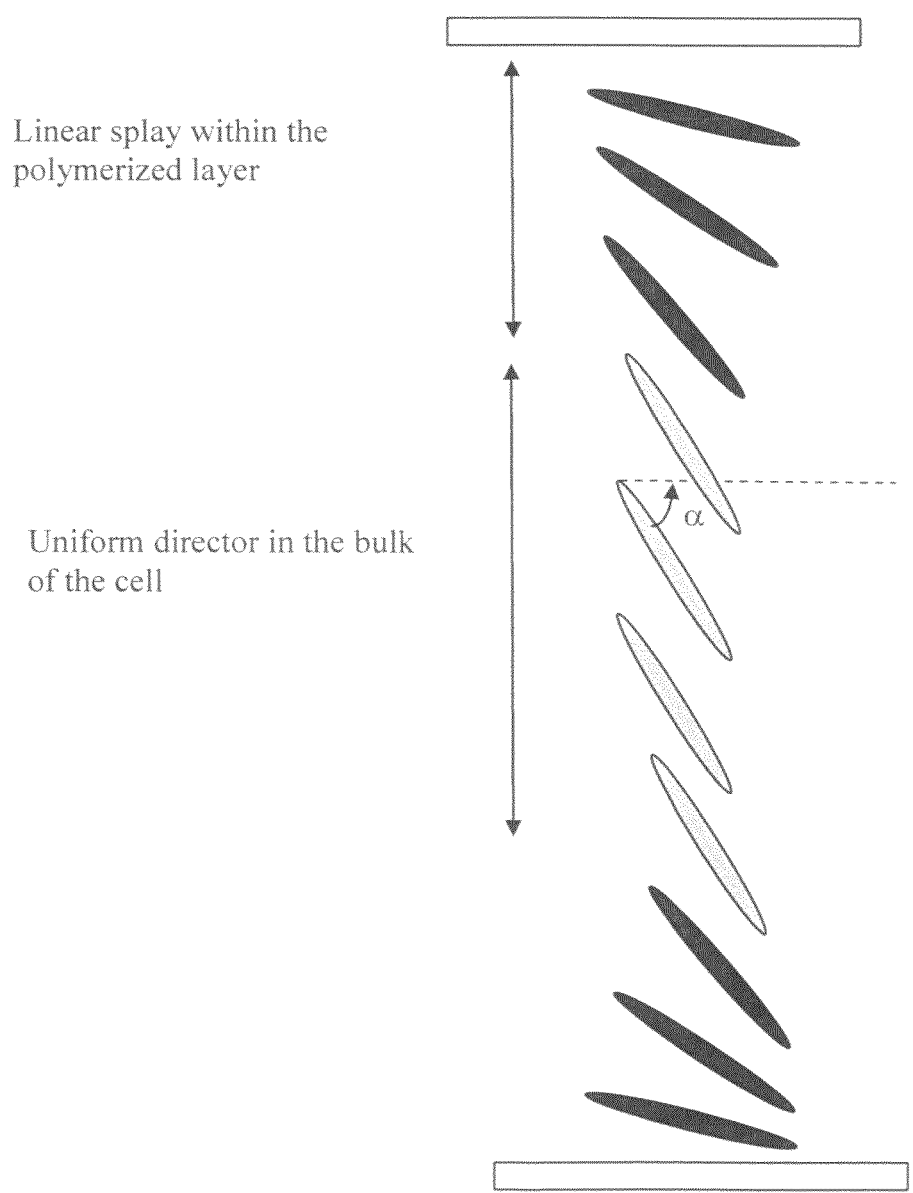
FIG. 12 illustrates the director distribution used in modeling the phase shift vs. incidence angle curves.
Figure 13:
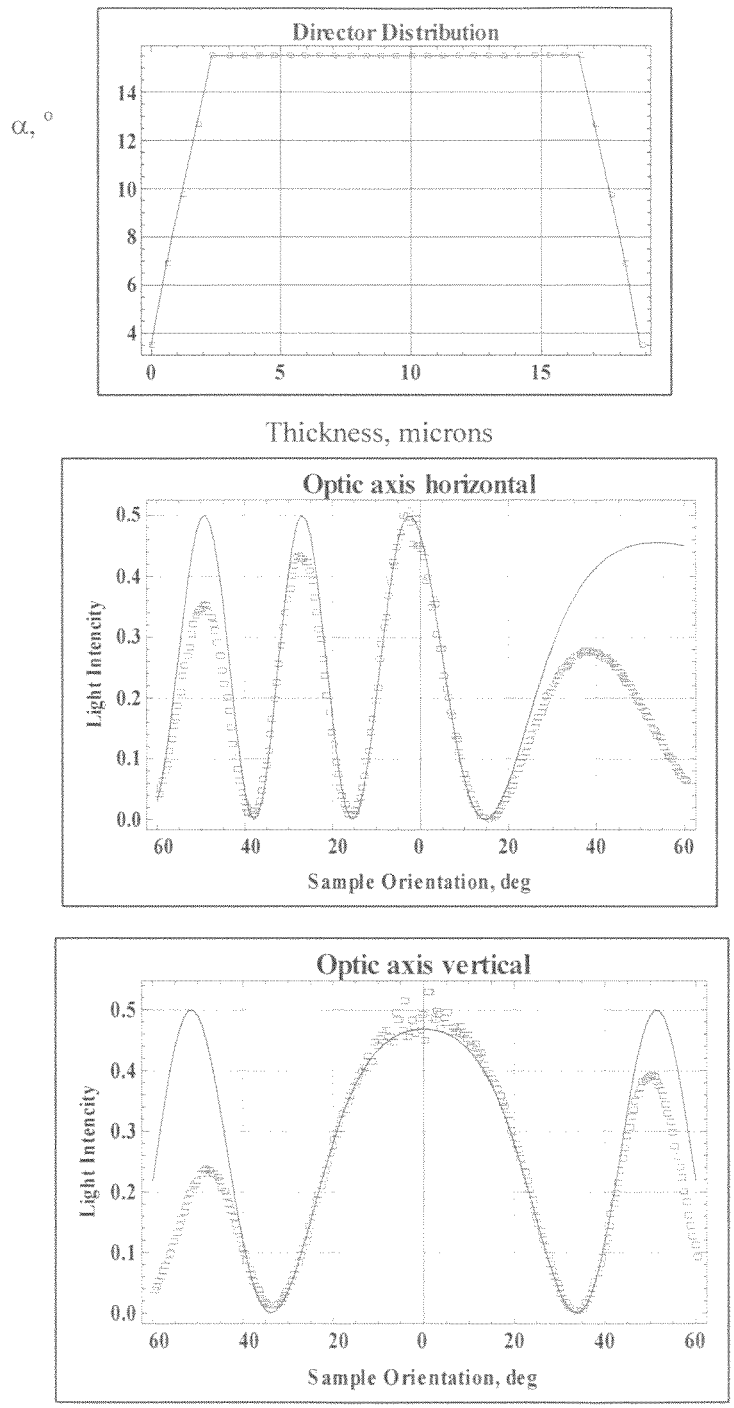
FIG. 13 shows the director distribution and transmission vs. incidence angle curves for a cell filled with MLC 6080 and 0.5% by weight of BAB polymerized at 10 V from 2 sides, wherein solid lines on transmission vs. incidence angle curves correspond to modeled curves, dotted- to the measured data and thickness of the modeled cell d=18.8 microns.
Figure 14:
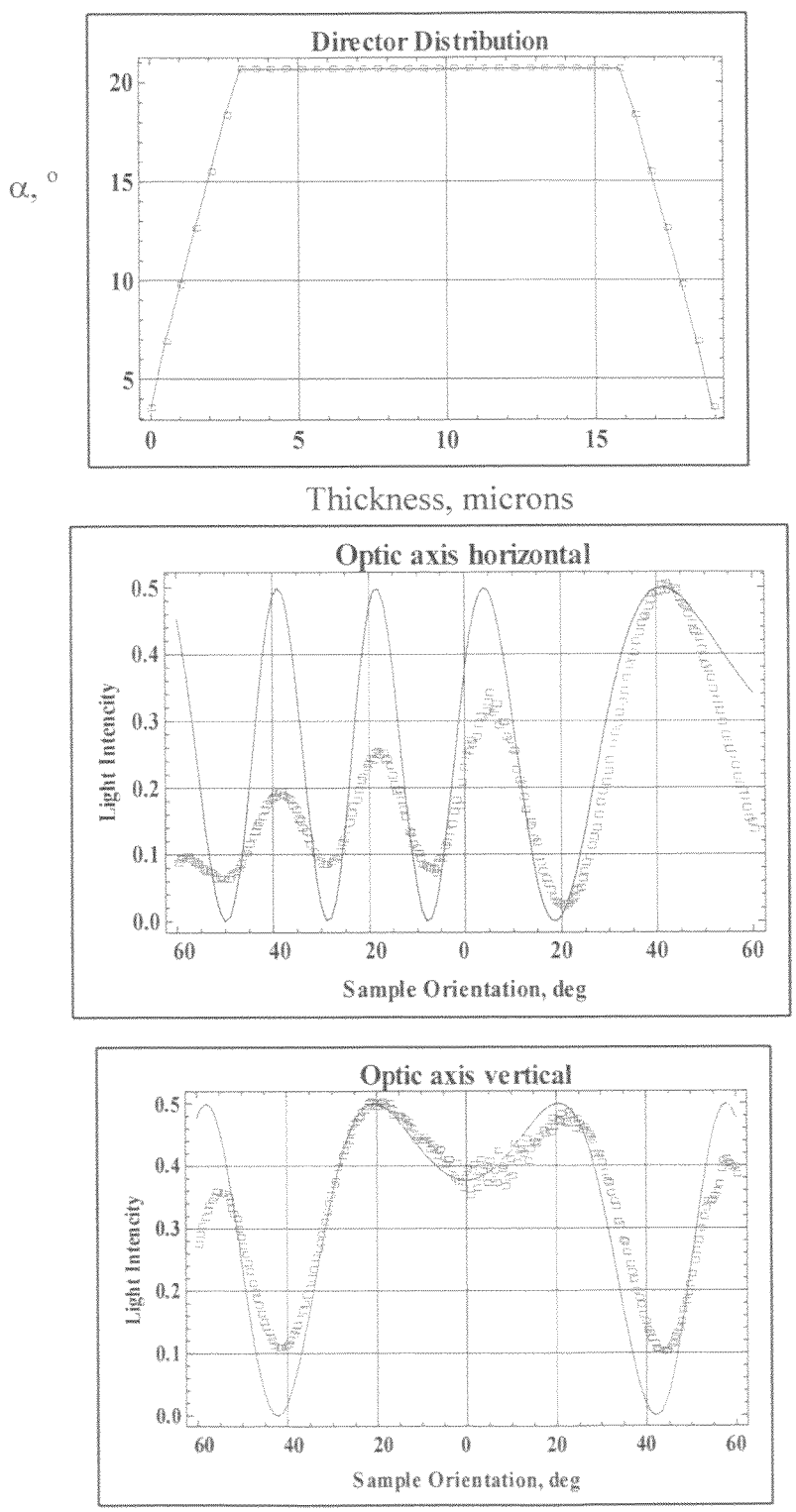
FIG. 14 shows the director distribution and transmission vs. incidence angle curves for a cell filled with MLC 6080 and 0.5% by weight of BAB polymerized at 20 V from 2 sides, wherein solid lines on transmission vs. incidence angle curves correspond to modeled curves, dotted- to the measured data, and thickness of the modeled cell d=18.9 microns.
Figure 15:
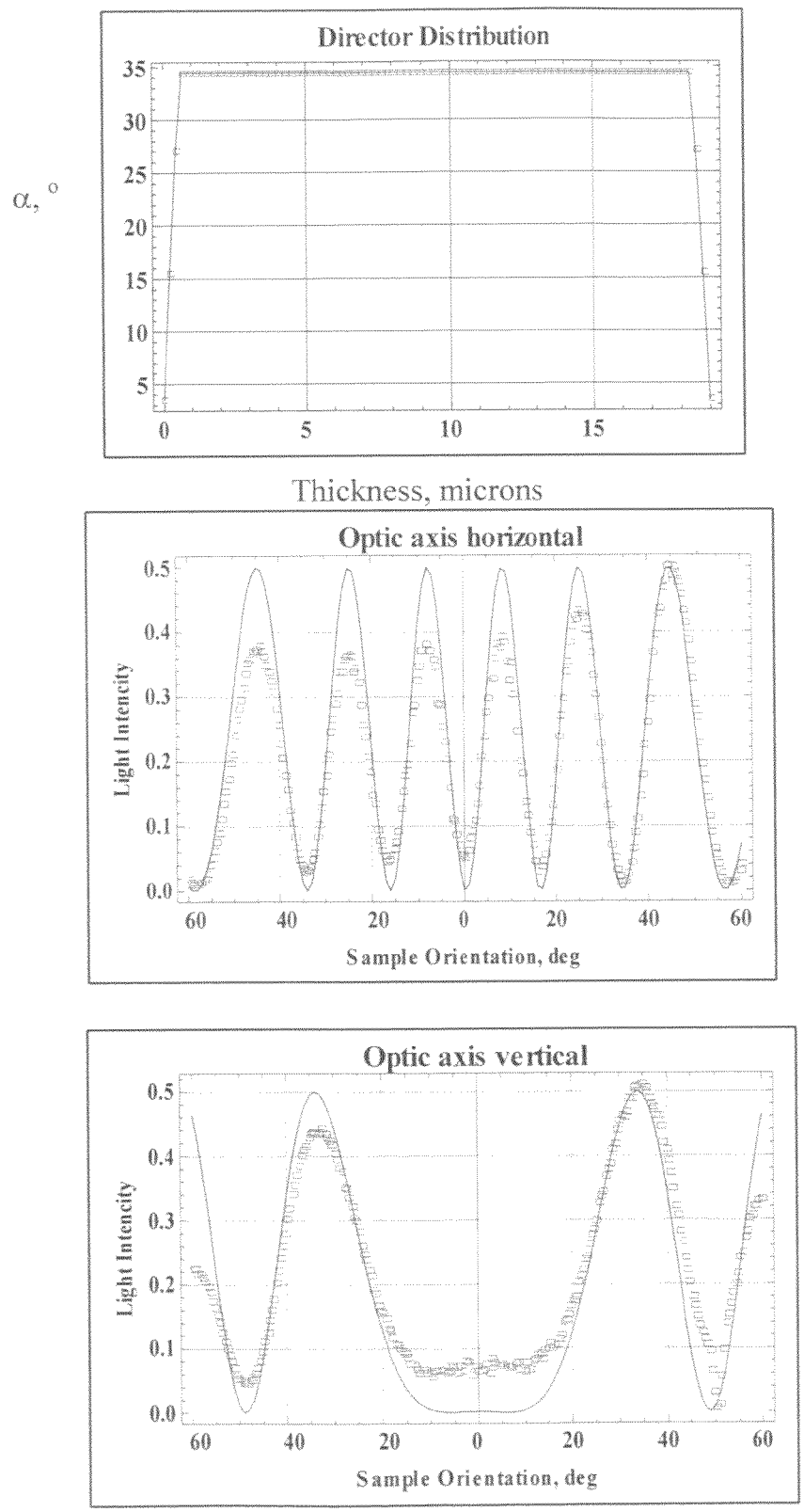
FIG. 15 shows the director distribution and transmission vs. incidence angle curves for a cell filled with MLC 6080 and 0.5% by weight of BAB polymerized at 35 V from 2 sides, wherein solid lines on transmission vs. incidence angle curves correspond to modeled curves, dotted- to the measured data, and thickness of the modeled cell d=19 microns.
Figure 16:
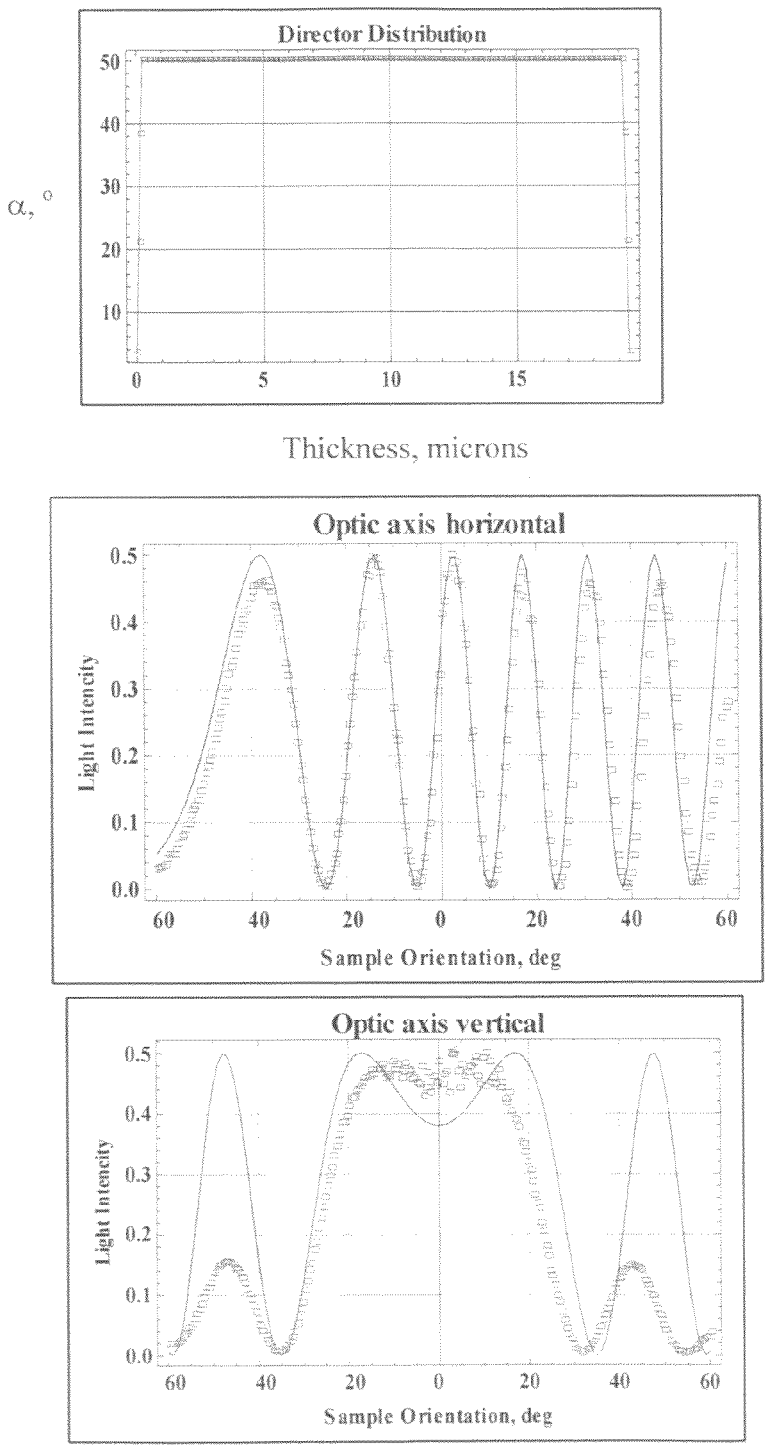
FIG. 16 shows the director distribution and transmission vs. incidence angle curves for a cell filled with MLC 6080 and 0.5% by weight of BAB polymerized at 50 V from 2 sides, wherein solid lines on transmission vs. incidence angle curves correspond to modeled curves, dotted- to the measured data, and thickness of the modeled cell d=19.4 microns.
Figure 17:
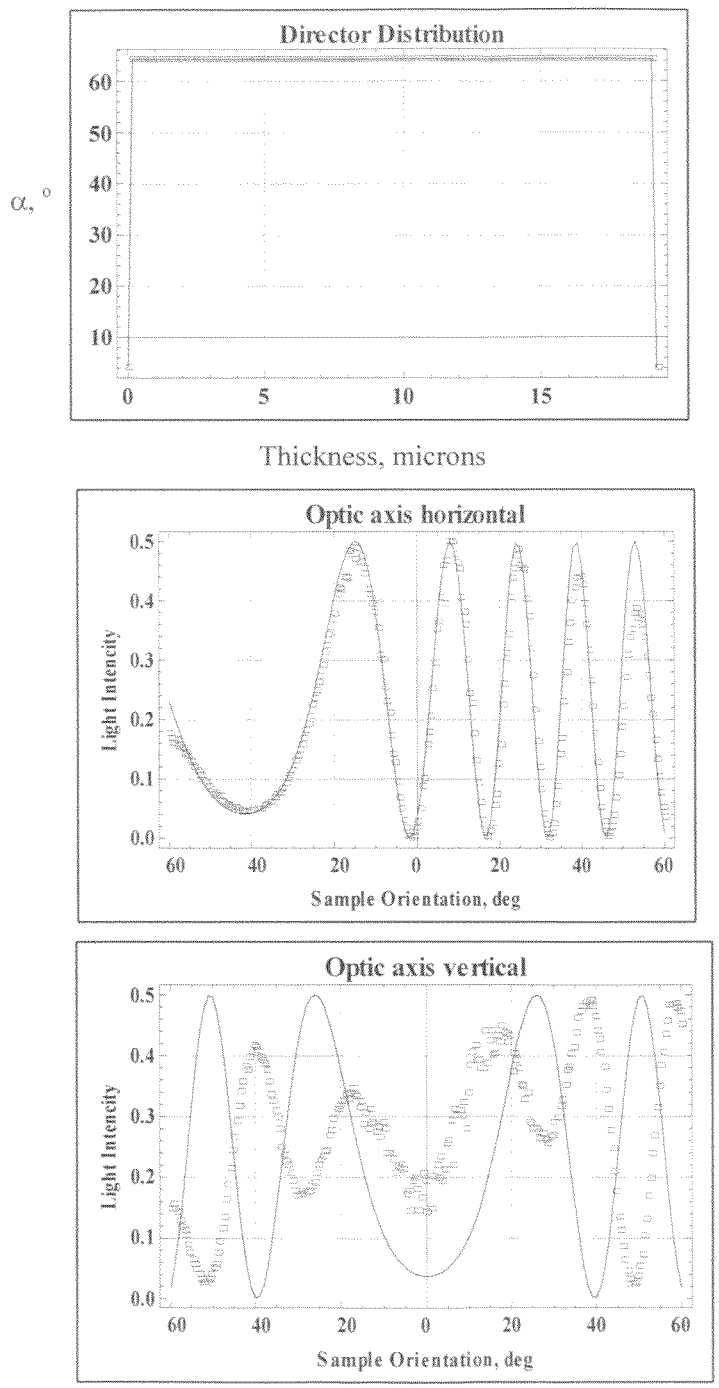
FIG. 17 shows the director distribution and transmission vs. incidence angle curves for a cell filled with MLC 6080 and 0.5% by weight of BAB polymerized at 100 V from 2 sides, wherein solid lines on transmission vs. incidence angle curves correspond to modeled curves, dotted- to the measured data, and thickness of the modeled cell d=19.2 microns.
Figure 18:
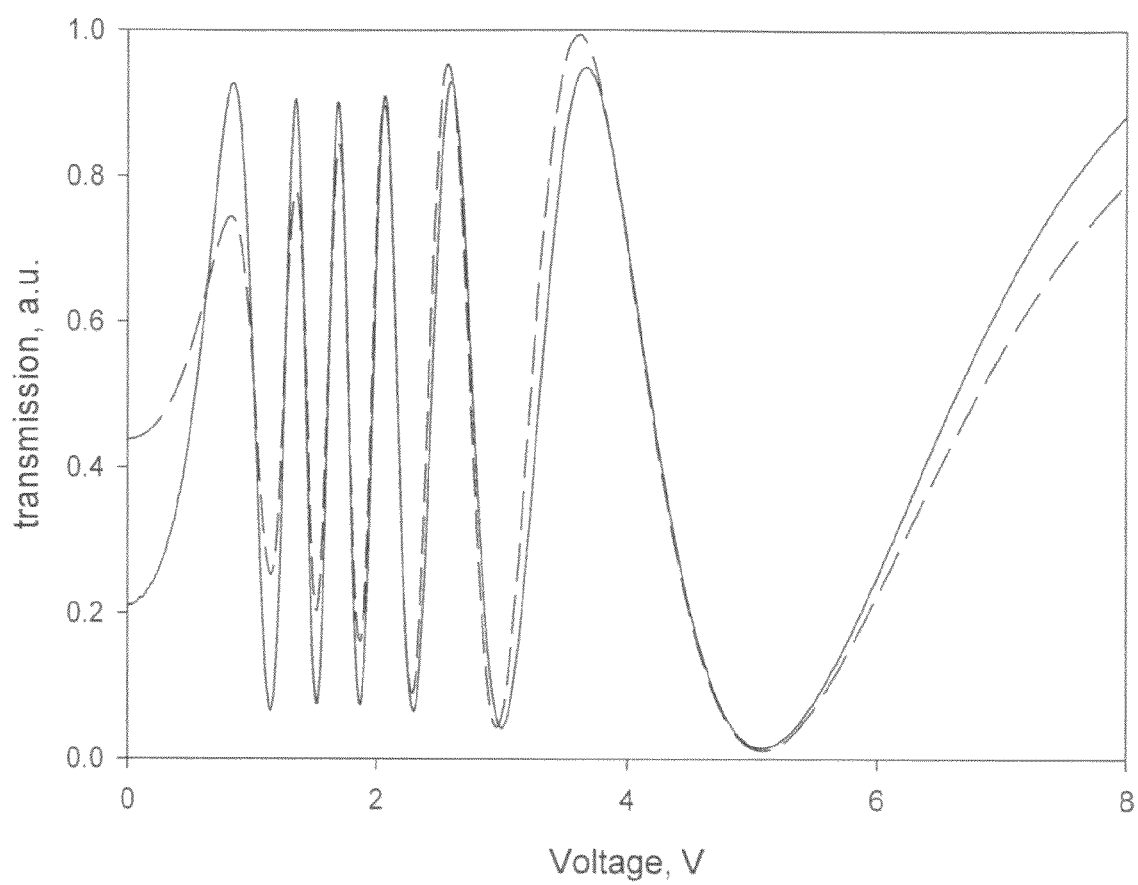
FIG. 18 shows the transmission versus voltage (T-V) curves for a cell filled with MLC 6080 and 0.5% by weight of BAB polymerized at 10 V from 2 sides, wherein solid lines on T-V curves correspond to measured curves, and dashed lines to the modeled curves for the cell thickness d=19.5 microns and the pre-tilt angle of $\alpha=13°$.
Figure 19:
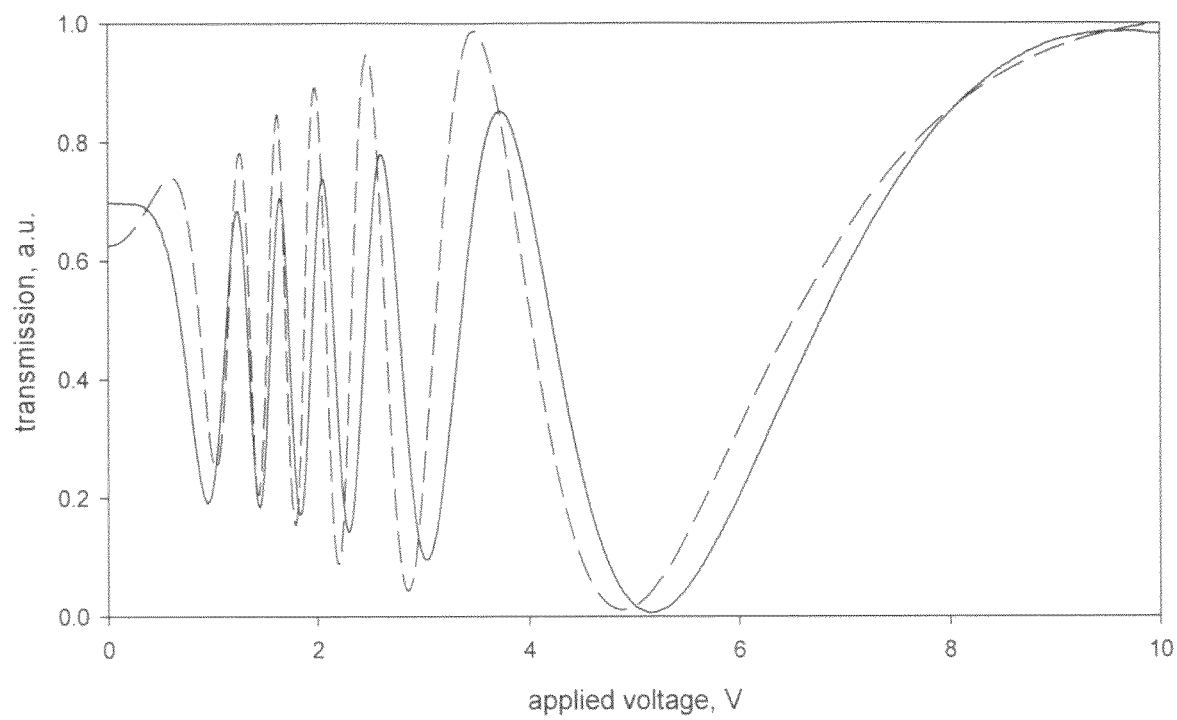
FIG. 19 shows the T-V curves for a cell filled with MLC 6080 and 0.5% by weight of BAB polymerized at 20 V from 2 sides, wherein solid lines on T-V curves correspond to measured curves, and dashed lines to the modeled curves for the cell thickness d=19.5 microns and the pre-tilt angle of $\alpha=15°$.
Figure 20:
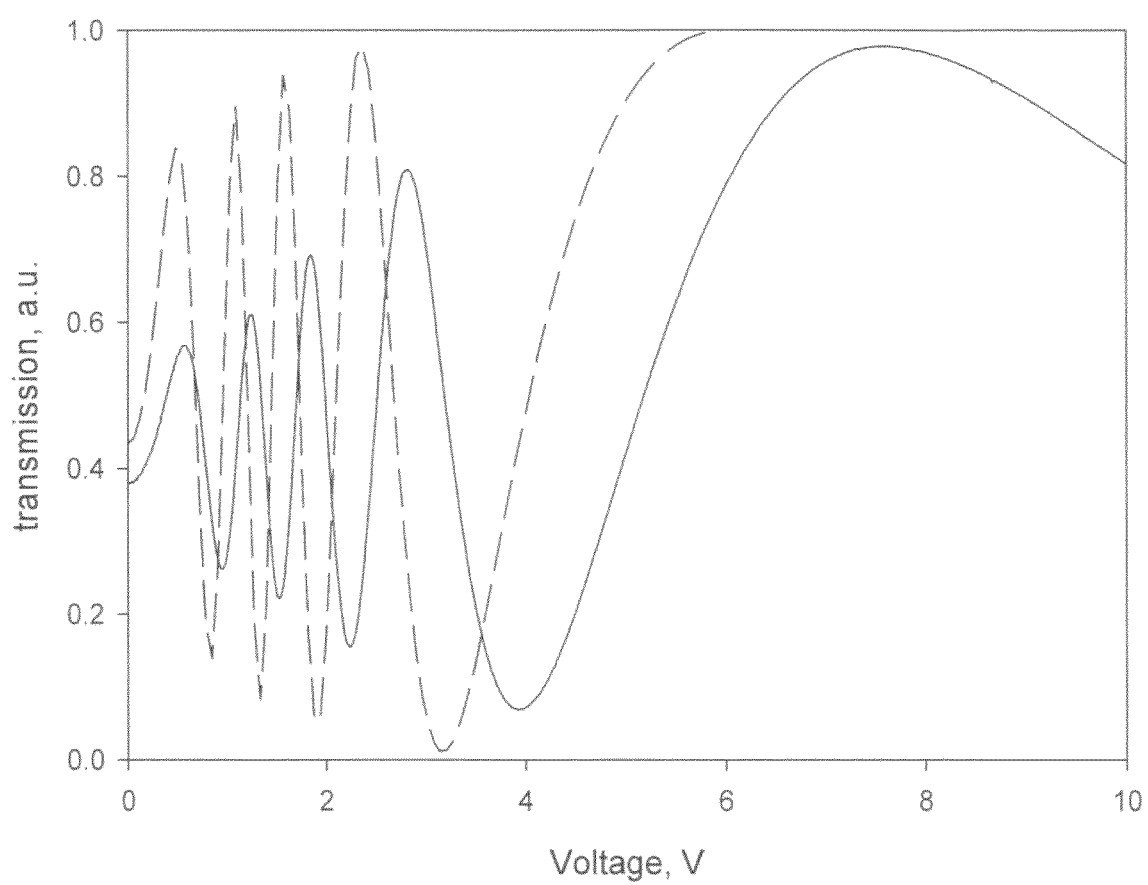
FIG. 20 shows the T-V curves for a cell filled with MLC 6080 and 0.5% by weight of BAB polymerized at 35 V from 2 sides, wherein solid lines on T-V curves correspond to measured curves, and dashed lines to the modeled curves for the cell thickness d=20 microns and the pre-tilt angle of $\alpha=34°$.
Figure 21:
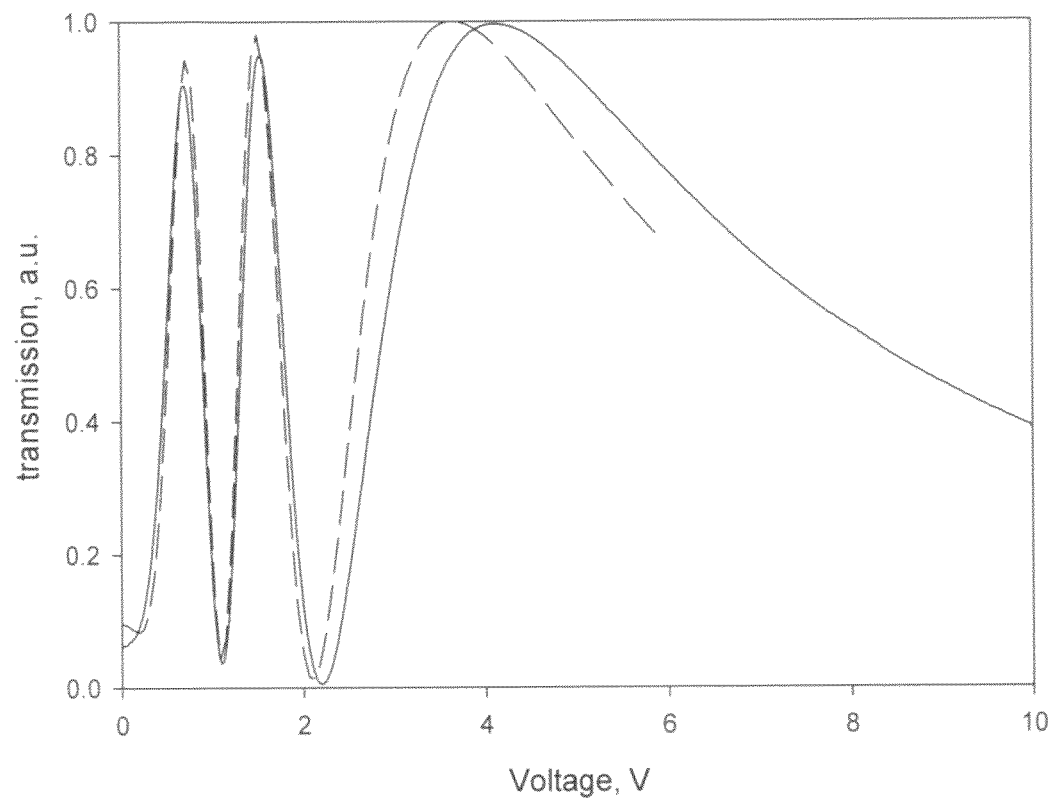
FIG. 21 shows the T-V curves for a cell filled with MLC 6080 and 0.5% by weight of BAB polymerized at 50 V from 2 sides, wherein solid lines on T-V curves correspond to measured curves, and dashed lines to the modeled curves for the cell thickness d=20 microns and the pre-tilt angle of $\alpha=47.5°$.
Figure 22:
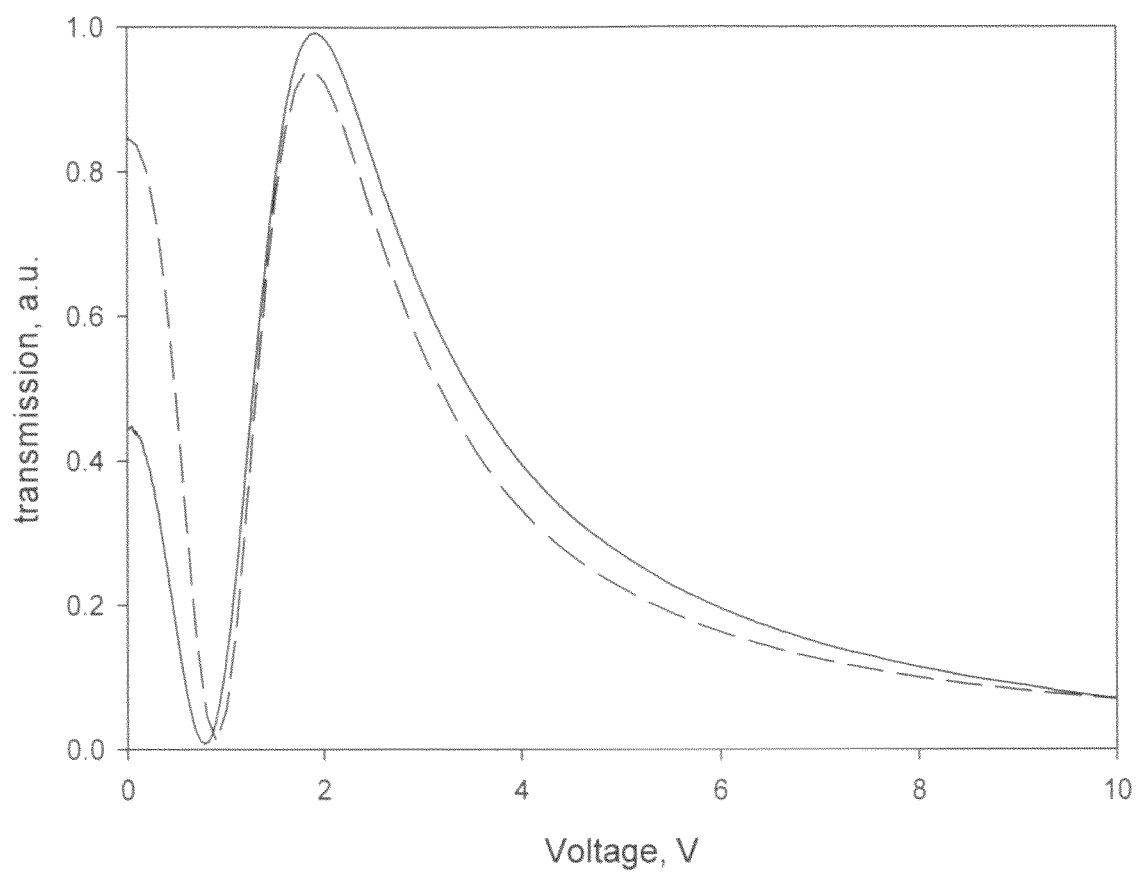
FIG. 22 shows the T-V curves for a cell filled with MLC 6080 and 0.5% by weight of BAB polymerized at 100 V from 2 sides, wherein solid lines on T-V curves correspond to measured curves, and dashed lines to the modeled curves for the cell thickness d=20 microns and the pre-tilt angle of $\alpha=62'$.

FIG. 12 shows the primary director configuration that was used in the modeling of the transmission versus incidence angle curves. In this Figure, the liquid crystal director overcomes a linear splay within a thin layer that is adjacent to the substrate, and is uniform in the bulk. The polar angle for the director in the bulk was the primary fitting parameter. The secondary fitting parameter was a relative thickness of the polymerized layers.

FIGS. 13-17 show measured and modeled transmission versus incidence angle curves for the cells irradiated with UV light from both sides when voltage of 10, 20, 35, 50 and 100 V, respectively, was applied during polymerization. In all cases, the director profile was characterized by a tilt angle $\alpha$, that is measured with respect to the cell substrate, see FIG. 12. The number of dots on each director distribution curve corresponds to a number of uniaxial layers with fixed orientation of the optic axis ($\alpha$=const), that were used in modeling. Results of modeling for the cells irradiated from two sides are shown in Table 1.

TABLE 1

Director distribution in the cells (MLC 6080 + 0.5% BAB) irradiated from two sides during polymerization

| Applied voltage during UV light polymerization | Director distribution |
|---|---|
| 10 V applied | Thickness of the polymer layer - 2 microns Director tilt in the bulk $\alpha$ = 15.5° |
| 20 V applied | Thickness of the polymer layer - 3 microns Director tilt in the bulk $\alpha$ = 21° |
| 35 V applied | Thickness of the polymer layer - 1.5 microns Director tilt in the bulk $\alpha$ = 34.5° |

TABLE 1-continued

Director distribution in the cells (MLC 6080 + 0.5% BAB) irradiated from two sides during polymerization

| Applied voltage during UV light polymerization | Director distribution |
|---|---|
| 50 V applied | Thickness of the polymer layer - 0.1 microns Director tilt in the bulk $\alpha = 50°$ |
| 100 V applied | Thickness of the polymer layer - <0.1 microns Director tilt in the bulk $\alpha = 62°$ |

Pre-tilt angle in the same cells was also estimated from transmission versus (T-V) voltage curves that were measured as described in Example 1. Measured curves were compared with the modeled T-V curves. Modeling was performed under the assumption that the director distribution in the cells after polymerization is uniform, same as in planar cells with high pre-tilt angles. In the modeling the main fitting parameter was the pre-tilt angle, whereas the cell thickness was adjusted only slightly within the range of 19.5-20 microns. Modeling was performed by using Twist Cell Optics software [Twist Cell Optics 7.2 software developed at Liquid Crystal Institute, Kent State University, Kent, Ohio, USA]. The calculations of the equilibrium director configuration were based on the Frank-Oseen theory. The Euler-Lagrange formalism was used to obtain the equations of motion. We used standard relaxation techniques to solve them numerically. Light propagation through a stack of optically anisotropic layers was performed by using Berreman's 4×4 matrix method [D. W. Berreman, J. Opt. Soc. Am., 62, 502 (1972)].

FIGS. 18-22 show the measured and modeled T-V curves for the cells polymerized at 10, 20, 35, 50 and 100V. Because modeling was performed under the assumption of the initially uniform planar cell, the results should be compared with the average molecular tilt angles that can be easily calculated from results obtained by using the crystal rotation method. Table 2 presents data on pre-tilt angles obtained by two methods assuming the uniform planar molecular distribution within the LC cell.

TABLE 2

Pre-tilt angle in the cells (MLC 6080 + 0.5% BAB) irradiated from two sides during polymerization

| Applied voltage during UV light polymerization | Average molecular tilt angle (equal to the pre-tilt angle in case of the uniform molecular distribution obtained from the crystal rotation method) | Pre-tilt angle obtained from fitting the T-V curves in case of the uniform initial molecular distribution |
|---|---|---|
| 10 V applied | $\alpha = 14°$ | $\alpha = 13°$ |
| 20 V applied | $\alpha = 17.5°$ | $\alpha = 15°$ |
| 35 V applied | $\alpha = 32°$ | $\alpha = 34°$ |
| 50 V applied | $\alpha = 50°$ | $\alpha = 47.5°$ |
| 100 V applied | $\alpha = 62°$ | $\alpha = 62°$ |

Figure 23:
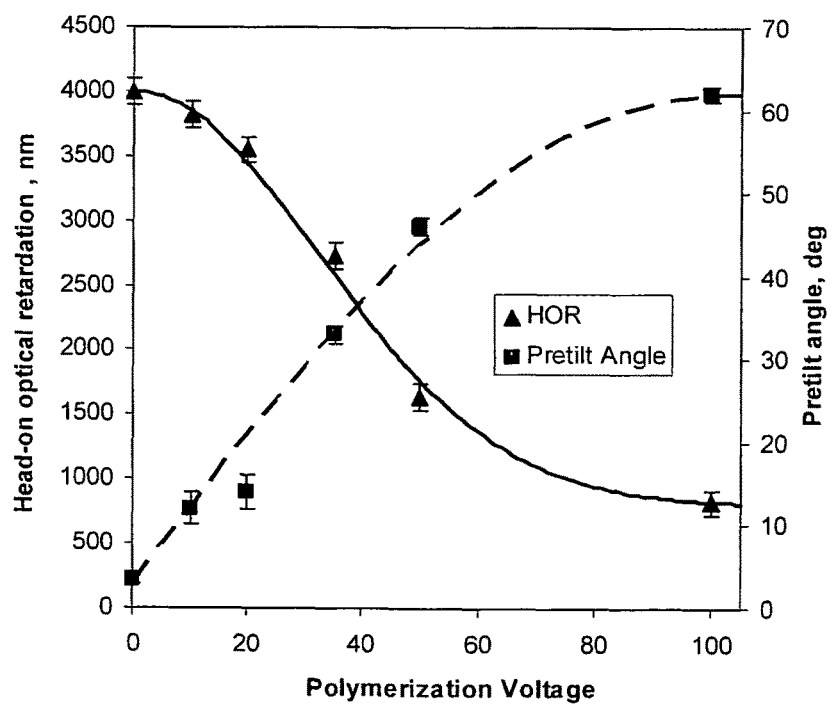
FIG. 23 is a graph that shows the head-on retardation and pre-tilt angle at various polymerization voltages for 20 μm-thick cells filled with MLC 6080+0.5% BAB monomer (pre-polymerization voltage 100V)

FIG. 23 summarizes the results of our experiments described in this example. In this figure we plotted the head-on retardation and pre-tilt angle at various polymerization voltages for 20 μm-thick cells filled with MLC 6080+0.5% BAB monomer (pre-polymerization voltage 100V). As evident from experimental data, the HOR can be decreased to almost zero, which indicates continuous change from the planar to homeotropic molecular alignment.

Example 4

In this example, how to fabricate a cell that has different pre-tilt angles at different cell sites is described.

Figure 24:
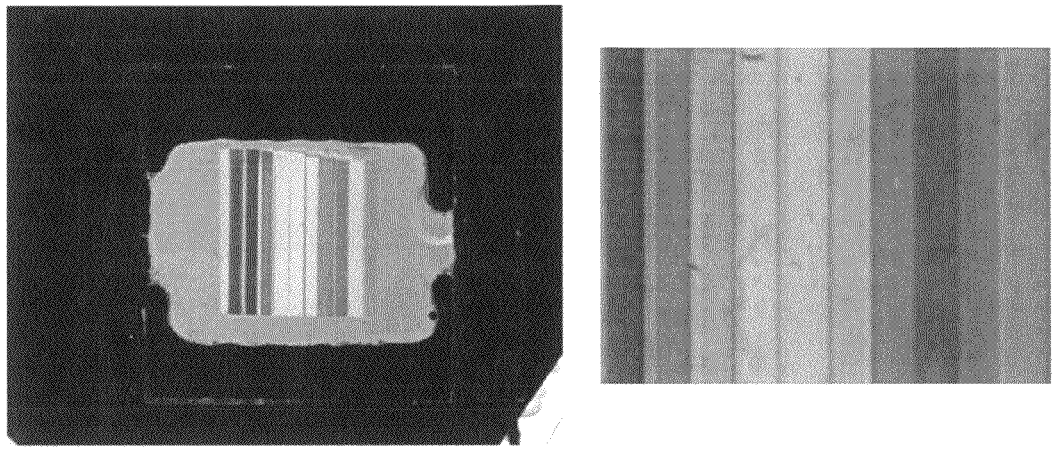
FIG. 24 shows an image of a cell with variable head-on birefringence produced by a subsequent UV-light irradiation through a narrow slit when different voltage is applied at each irradiation step, wherein a low voltage of about 1 V is applied across the finished cell for a demonstration purpose.

To fabricate a cell that has variable pre-tilt across its surface, a uniform 20-micron thick cell was filled with LC 13849 and 0.5% of the BAB monomer. Characteristic stripes that indicate areas of various HOR and hence, pre-tilt, were achieved throughout following a step-by-step process. First, the highest voltage was applied across the cell, and the cell was irradiated from one side with the UV light incident through a narrow slit of about 1 mm. After polymerization was complete, the applied voltage was decreased, the cell was moved by about 1 mm, with respect to the slit, so that a previously unexposed area can be irradiated and the polymerization process was repeated. The procedure was repeated several times, until the cell with spatially variable pre-tilt was formed. Irradiation time for each consecutive step was about 3 minutes. The radiation power density at the cell site was about 0.015 W/cm$^2$. FIG. 24 shows a liquid crystal cell with variable pre-tilt with its surface fabricated by using this method.

Example 5

In this example it is shown how to fabricate a cell with a continuous change of pre-tilt across the cell. In this example, we used 20-μm thick planar liquid crystalline cells filled with LC 18349 and 0.75% of the BAB monomer (by weight).

Figure 2:
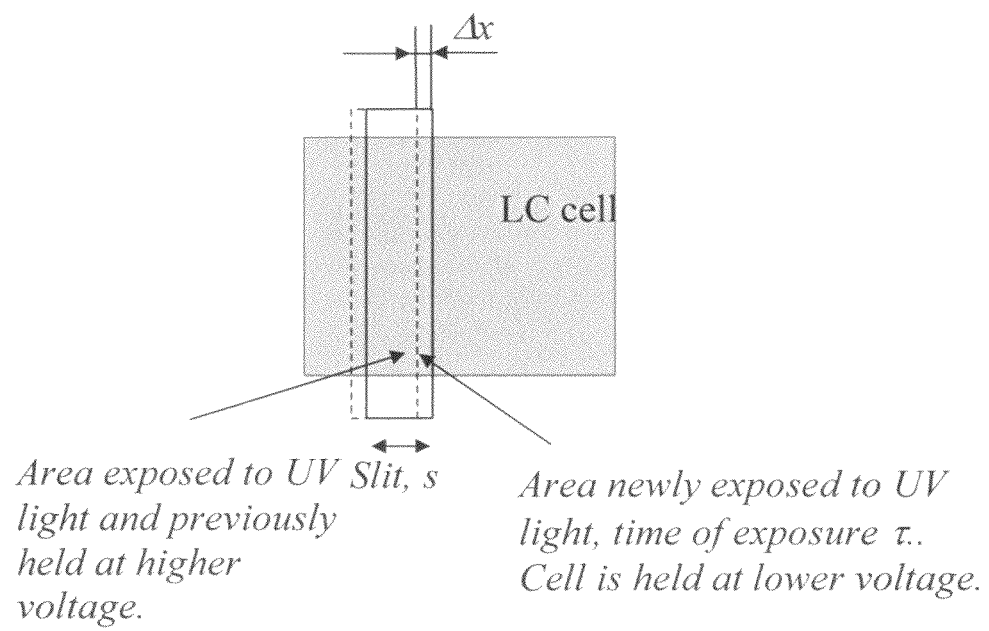
FIG. 2 is a top view of a schematic illustrating one embodiment of a method of the present invention particularly illustrating the use of a mask including a slit to provide the desired exposure of ultraviolet light to a portion of a liquid crystal cell.

The process starts with the formation of regions with low retardation at the outer edge of the cell as compared to a central area of the cell. This required high voltages being applied to the cell. With high voltages applied across the cell, the cell's edge was irradiated from one cell side with UV light through a narrow slit with the width of s=0.8 mm. Time of UV radiation varied from τ=2 seconds to 5 seconds. UV power density was about 0.015 W/cm$^2$. The cell was then moved by a small distance of Δx=10 μm in a horizontal direction and, at the same time, the voltage across the cell was decreased. FIG. 2 illustrates the irradiation process: newly exposed areas have a width of Δx=10 μm, however, a portion of previously exposed cell is still under the UV irradiation. The subsequent radiation of previously unexposed parts of the cell initiated formation of a polymer network in the stripe and the width of Δx under the decreased voltage. Since the UV lamp was working continuously, there was an ongoing polarization process in the rest of the exposed area that took place at the lower voltage. The overall exposure time for a 10-mm wide area is about 3 minutes.

Figure 25:
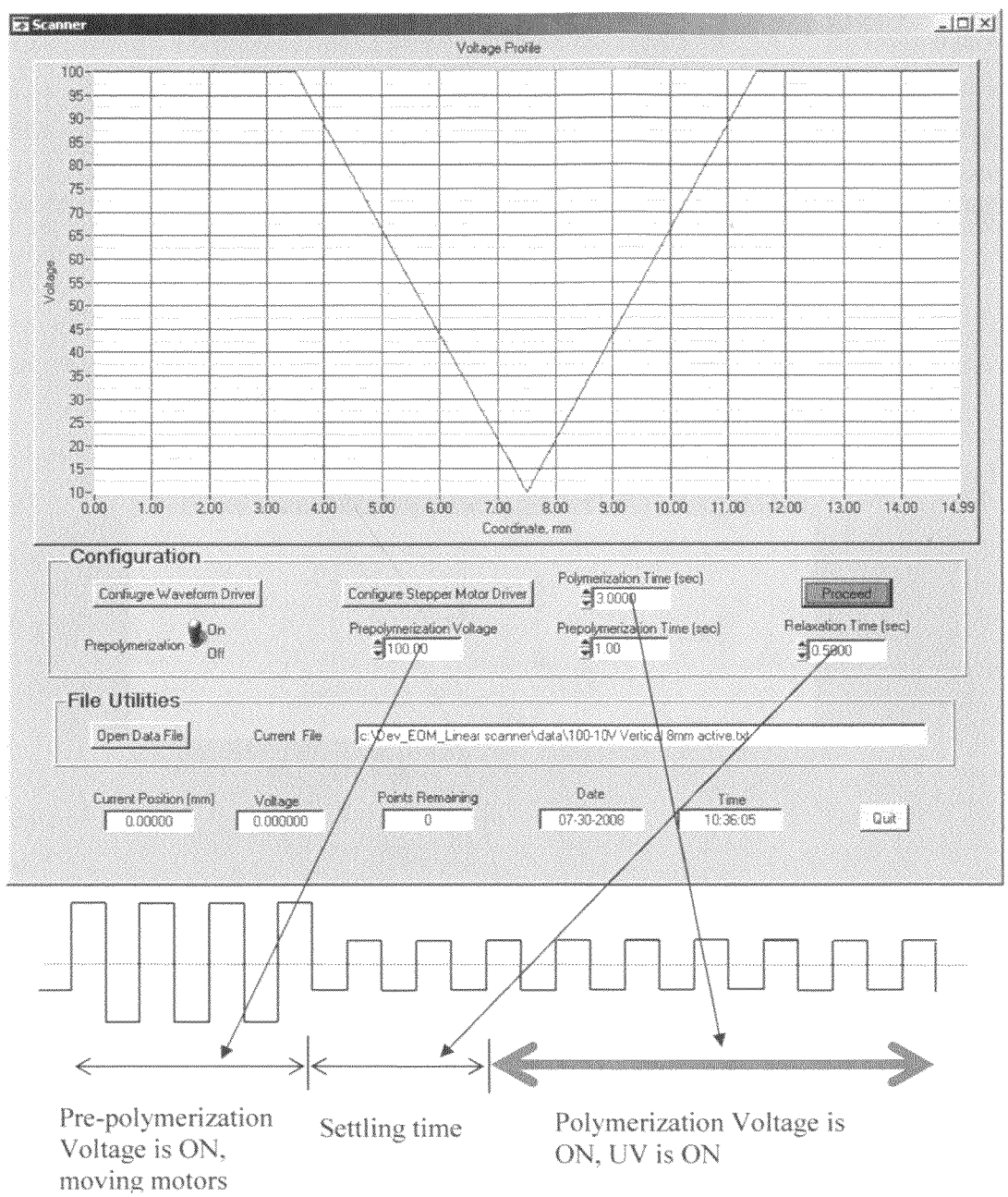
FIG. 25 is a chart showing applied voltage as a function of the position of the slit on the cell.

When the center of the cell was positioned in front of the slit, the applied voltage was dropped to zero, thus enabling formation of the stripe with the lowest pre-tilt and maximum head-on birefringence. As the cell is moved further, the applied voltage increases step-by-step, reaching its maximum at the opposite cell side. The applied voltage profile used is shown in FIG. 25. It was found that the liquid crystalline structure had been fixed in place during the first exposure for the time τ and corresponds to a voltage that is applied at the time of this first exposure. The subsequent exposure to UV light at lower voltages did not substantially change the liquid crystal distribution near the substrates, but it only helped to complete the polymerization process. This allowed for almost continuous change of pre-tilt across the cell.

Figure 26:
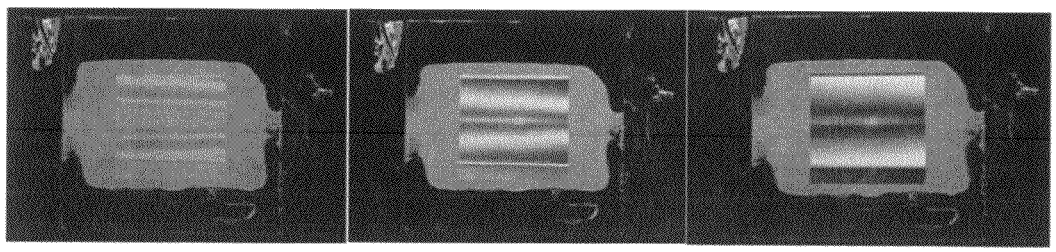
FIG. 26 shows a cell with spatially variable pre-tilt, wherein in order to visualize change in the cell's optical retardation, driving voltages of (a) 1.25, (b) 2.5 and (c) 5 V were applied.

FIG. 26 shows photos of the cell with continuously varied pre-tilt, which was fabricated by using the described technique. Voltage of 1.25, 2.5 and 5V were applied in order to better visualize the change in the cell's birefringence. This cell was fabricated under continuous UV light irradiation through a slit of s=0.8 mm when the cells were moved in a horizontal direction with the step of Δx=10 μm with t=2 seconds for each step.

Figure 27:
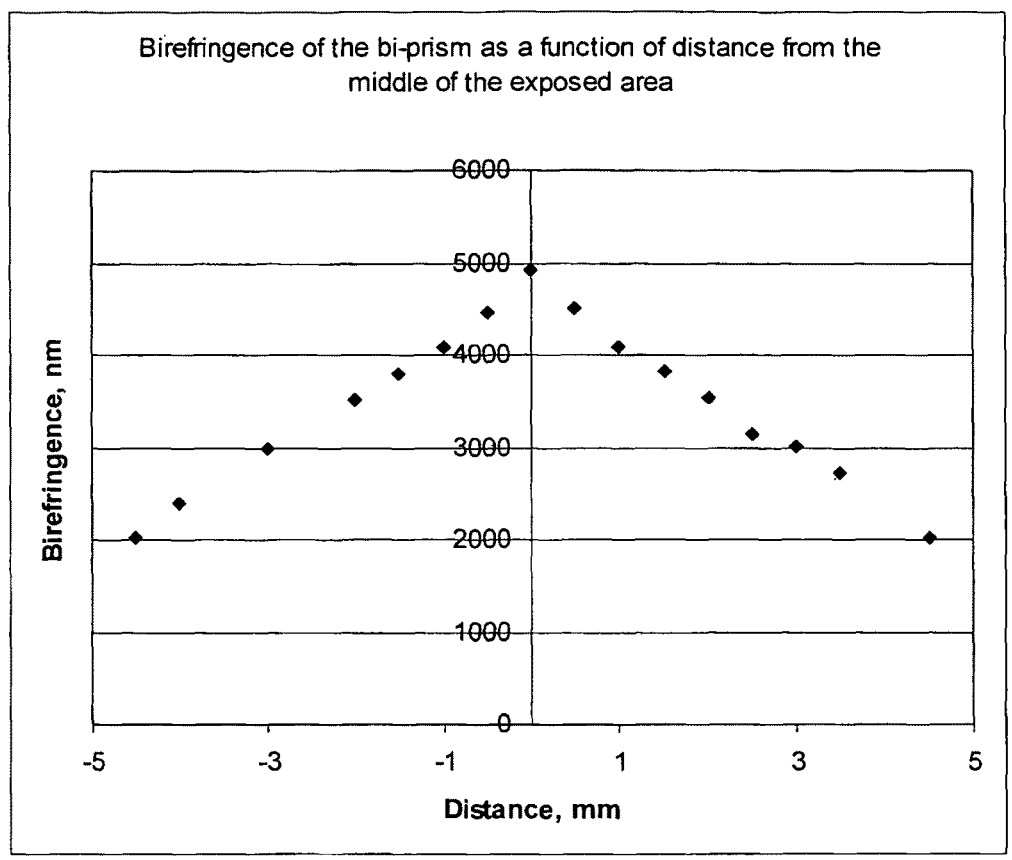
FIG. 27 is a graph showing measured head-on retardation as a function of the distance from the center of the cell with spatially variable pre-tilt (cell is shown in FIG. 26)

FIG. 27 shows a measured head-on retardation as a function of the distance from the center of the cell. As evident from FIG. 27, birefringence of the liquid crystal cell changes substantially linearly with distance from the center of the cell.

Example 6

In this example, how to fabricate a cell that has variable pre-tilt across the cell surface that shows very low light scattering was described. The cell was made from a 20-μm-thick planar liquid crystalline cell filled with MLC 6080+0.5% of the monomer by weight.

As evident from the experimental data presented in Example 3 the intermediate voltages of 15-40 V yield liquid crystalline structures that can be approximated having a relatively thick splay layer near the cell substrates. In order to have efficient pre-tilt control, the thickness of the polymerized layer must be much smaller that the cell gap and, in most cases, smaller than 1 micron. In order to fabricate the polymer stabilized LC cells that electro-optically behave as planar cells with pre-tilts within the range of α=15°-45°, we modified our technique as follows.

Figure 28:
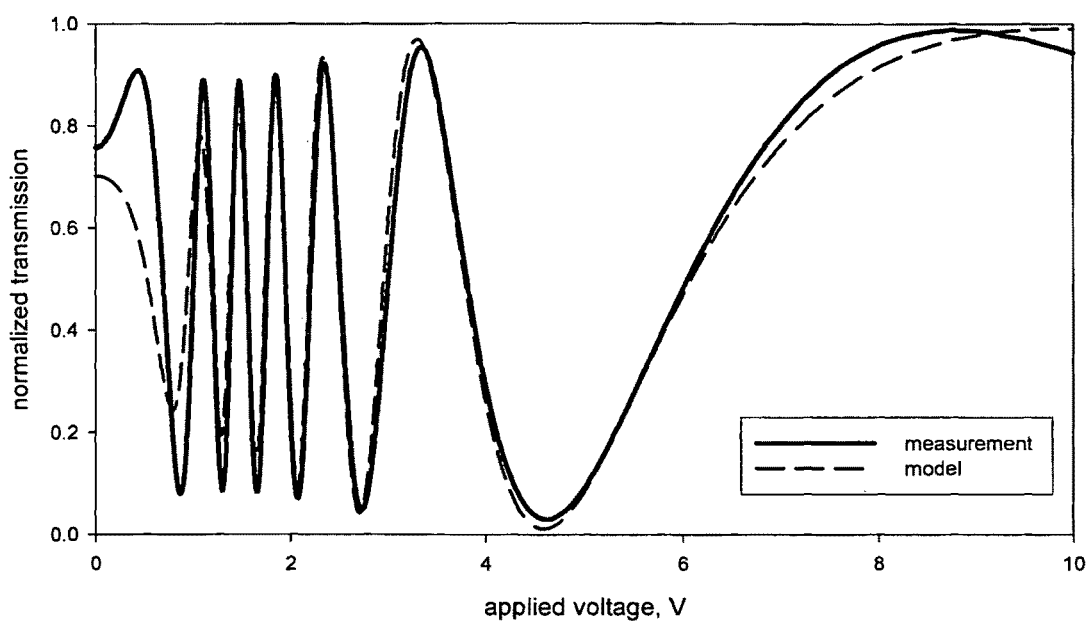
FIG. 28 shows measured and modeled T-V curves for a 20 μm-thick cell filled with MLC6080+0.5% BAB monomer that was UV cured at polymerization voltage 20V and pre-polymerization voltage 100 V by alternating curing and pre-polymerization steps; the modeled curve corresponds to a uniformly aligned 19.5 μm-thick cell with pre-tilt angle 18°.

To strengthen the network and localize it closer to the substrates, we modified our method by applying a high pre-polymerization voltage of 100V across the cell for several seconds, then started polymerization at the desired $V_p$ for 3 sec. However, we did not fully polymerize the monomer but rather interrupted polymerization by turning off the UV light for a period of time, 1 second, during which the high voltage of 100V was applied again. After reducing the voltage to $V_p$, the polymerization was resumed for another 3 seconds. The process was repeated for a desired number of cycles, such as about 45 cycles, which resulted in the fabrication of a uniform cell with a fully polymerized alignment sub-layer. FIG. 28 shows the measured and modeled T-V curves for a 20 μm-thick cell filled with MLC6080 and 0.5% BAB monomer that was UV cured at a polymerization voltage of 20V and pre-polymerization voltage of 100 V by alternating curing and pre-polymerization steps; the modeled curve corresponds to a uniformly aligned 19.5 μm-thick cell with a pre-tilt angle of 18°.

Figure 29:
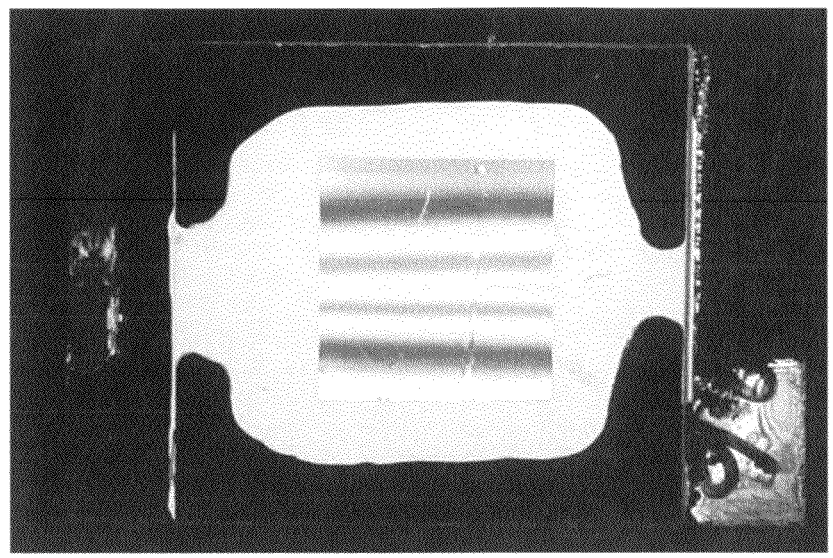
FIG. 29 is an image of a bi-prism fabricated using one method of the invention that includes a pre-polymerization step, wherein the prism's head-on retardation is varied from about 0 (at the edge) to Δnd~3.5 μm (at the center), wherein voltage of 2V was applied to the cell to visualize change in the cell's birefringence.

This technique was applied for fabrication of a bi-prism. The process started with a pre-polymerization step, where high voltage of 100 V was applied across the cell for about 15 seconds. After the pre-polymerization step was completed, the formation of the regions with high pre-tilt followed, and hence, low HOR at the edge of the cell. This required high voltage of 100 V being applied to the liquid crystal cell. With the high voltage applied across the cell, the cell's edge was exposed to UV light from one UV lamp positioned in front of the cell. The cell was irradiated with UV light through a slit with a width of s=0.8 mm. The time of UV exposure chosen was about τ=3 seconds for each step. The cell was then moved a small distance of Δx=10 μm along horizontal, the pre-polymerization step was executed, with UV off, and the applied voltage was changed according to a voltage profile similar to the one shown in FIG. 25. When the center of the cell was positioned in front of the slit, the applied voltage, at its minimum, was 10 V, thus enabling the formation of the region with maximum head-on birefringence and low pre-tilt. As the cell is moved further, the applied voltage increased step-by-step, reaching its maximum at the opposite cell side. FIG. 29 shows a photo of a cell fabricated by using the described technique. The used technique yielded a symmetric structure with head-on birefringence changing continuously and rather symmetrically with respect to the center of the cell.

Figure 30:
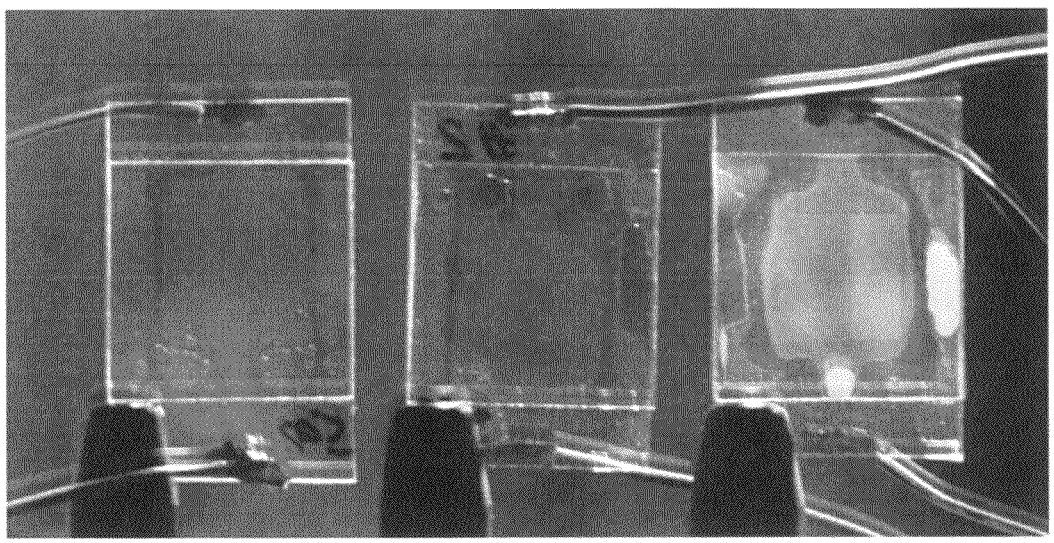
FIG. 30 is an image of cells with spatially variable pre-tilt manufactured according to the invention (the middle cell), a cell filled with pure MLC 6080 (cell on the left) and a cell fabricated without a pre-polymerization step (cell on the right)

FIG. 30 is a photo of three (3) different samples: 1) a cell filled with pure MLC 6080 (the left cell); 2) a cell with continuously variable pre-tilt manufactured with a pre-polymerization step (in the middle), and 3) a cell with continuously variable pre-tilt manufactured without pre-polymerization (the cell on the right). The latter cell demonstrated significant light scattering. The middle cell manufactured with a pre-polymerization technique scattered light similarly to the cell without a polymer network.

Example 7

In this example, how to fabricate a thick liquid crystal cell is described that had a continuously variable pre-tilt across the cell surface and showed very low light scattering. The cell was made from a 30-μm-thick planar liquid crystalline cell filled with MLC 6080+0.5% of the BAB monomer (by weight). The cell was fabricated according to a process described in Example 6 that includes a pre-polymerization step.

The process of fabrication started with the formation of the regions with low head-on retardation and high pre-tilt at the edge of the cell. This required high voltage of 120 V applied to the liquid crystal cell. With the high voltage applied across the cell, the cell's edge was exposed to UV light from one cell side. The UV power density was about 0.015 W/cm². The cell was irradiated with UV light through a slit with a width of s=0.6 mm. Time of UV exposure was chosen to be about τ=3 seconds for each step. The cell was then moved a small distance of Δx=10 μm along horizontal and, at the same time, the applied voltage was changed according to a linear voltage profile that was similar to the one shown in FIG. 25, with the starting voltage of 120 V near the cell's edge and zero voltage at the center of the cell. The used technique yielded a symmetric structure with head-on birefringence changing continuously and rather symmetrically with respect to the center of the cell. Head-on optical retardation (HOR) of the cell changed from almost zero (at the edge of the prism) to about 5.5 μm at the center, which corresponds to the overall change of HOR of about 10λ (λ=546 nm) on a distance of about 4 mm. This was equivalent to the change of the pre-tilt angle of almost 90° at the cell edge (corresponding to homeotropic alignment) to several degrees at the cell center (corresponding to planar alignment).

Methods for Creating "UV-Patterned" Devices:

General methods for creating variations and gradients in the head-on optical retardation of a liquid crystal cell comprising a liquid crystal device through the use of UV polymerization to establish pre-tilt in the cell are described herein. Specific methods for using this UV-patterning technique to create essentially "writable" devices, e.g., cells and lenses are disclosed herein. One of the major benefits of this technique is that the liquid crystal cell can be fully assembled structurally, and the lens profile created afterward by the UV writing processes described below, such that custom lenses, including those with non-symmetric phase profiles, are easy to produce.

Disclosed hereinbelow are several methods of producing three exemplary lens profiles: (1) an optical device with a continuous or substantially continuous change in retardation, such as a prism; (2) a device with circular symmetry, such as a spherical or parabolic lens; and (3) a device with no symmetry, such as a lens with a coma or off-centered bump.

In all three examples, the liquid crystal cell was first fabricated according to the methods disclosed above, or as known to those of ordinary skill in the art, without the polymer network forming, preferably UV curing, step. The UV patterning was then implemented, using variable low-voltage to create the appropriate amount of retardation.

Prismatic Lens

In this example, fabrication of a cell with a continuous change of head-on retardation across the cell is shown. In this example, a 20-μm thick planar liquid crystalline cell was filled with liquid crystal mixed with 0.75% of the monomer (by weight). The process started with the formation of regions with low head-on retardation at the edge of the cell. This required high voltage applied first to the entire cell, optionally with low-power density UV irradiation. With the voltage reduced, the cell's edge was irradiated from one cell side with UV light through a narrow slit with a width of about 0.8 mm. The time of UV irradiation varied from τ=2 seconds to 5 seconds; UV power density was about 0.015 W/cm².

The cell was then moved a small distance of Δx=10 μm in the horizontal direction and, at the same time, the applied voltage across the cell was decreased. FIG. 2 illustrates the irradiation process. Newly exposed areas had a width of Δx=10 μm; however, a portion of the previously exposed cell was still under the UV irradiation. The radiation of previously unexposed parts of the cell initiated the formation of a polymer network in the stripe of the width dx under the decreased voltage. Since the UV lamp was working continuously, there was also an ongoing polymerization process in the rest of the exposed area that takes place at the lower voltage. This residual irradiation strengthened the already developed polymer network by further promoting polymerization.

A well-developed polymer network was formed during the first 2 to 5 seconds and the further irradiation at the decreased voltage only strengthened the network, without substantially changing the initially set molecular distribution. Thus, the resultant head-on retardation at the cell site with the width Δx was set during the first seconds of polymerization, and the subsequent decrease in the applied voltage does not lead to its substantial change. The overall exposure time for a 10-μm wide area was about 3 minutes.

When the center of the cell was positioned in front of the slit, the applied voltage was dropped to zero, thus enabling formation of the stripe with maximum head-on birefringence. As the cells were moved further, the applied voltage was increased step-by-step, reaching its maximum at the opposite cell side. This method resulted in a single prismatic lens, with maximum head-on retardation at the cell edge irradiated at the minimum voltage.

In order to manufacture a bi-prism, a linear change is required in the optical path for the normal light incidence that is symmetric about the prism axis. To accomplish this, a linear V-shaped voltage profile was applied. The required voltage profile was estimated from the previously measured HOR versus polymerization voltage curves. If a cylindrical lens profile is required, a non-linear voltage profile symmetric about the cylinder axis is employed.

As mentioned herein, the liquid crystalline structure had been fixed in place during a first exposure and approximately corresponds to a voltage that was applied at the time of this first exposure. The subsequent exposure to UV light at lower voltages does not substantially change the liquid crystal distribution near the substrates, but only helps to complete the polymerization process. This allows for almost continuous change of the head-on retardation across the cell.

Example 8

This example describes how to fabricate a cell with variable HOR across the cell surface and shows very low light scattering.

Using a pre-polymerization process, cells were fabricated with variable optical path similar to a bi-prism: with high, i.e. first, head-on optical retardation at the center of the cell and lower retardation to the left and right, i.e. outwardly from the center. The bi-prism was made utilizing the materials and procedures from Example 6. In order to manufacture a bi-prism, a substantially linear change of the optical path was required for the light incident normally to the cell as a function of the distance from the center of the cell. The required voltage profile was estimated from previous measurements of a head-on birefringence of polymerized cells as a function of voltage applied during the polymerization process. Only the linear part of the characteristic curve was used.

FIG. 29 is a photo of a tunable bi-prism fabricated by using the described technique. The used technique yielded a symmetric liquid crystalline bi-prism with head-on birefringence changing continuously outwardly, and rather symmetrically, with respect to the center of the cell.

FIG. 30 is a photo of three different samples: (1) a cell filled with pure MLC 6080 (the left cell); (2) a bi-prism manufactured with a pre-polymerization step (in the middle); and (3) a bi-prism manufactured without pre-polymerization (the cell on the right). The latter cell demonstrated significant light scattering. The middle cell manufactured with a pre-polymerization technique scattered light similarly to the cell without a polymer network.

Example 9

The used technique described in Example 7 yields a symmetric liquid crystalline bi-prism with head-on birefringence changing continuously and rather symmetrically with respect to the center of the cell. Head-on optical retardation (HOR) of the prism changed from almost zero (at the edge of the prism) to about 5.5 μm at the center, which corresponds to the overall change of HOR of about 10λ (λ=546 nm) on a distance of about 4 mm.

Example 10

In a further example, the total time of fabrication of a bi-prism was decreased by increasing the UV power density and decreasing the time of each polarization step.

A bi-prism from a 20 μm thick planar liquid crystalline cell filled with MLC 6080 and 0.5% of the BAB monomer (by weight) was fabricated. This prism was fabricated according to the method described in Example 8; however, the UV power density was increased to 0.035 W/cm². The cell was irradiated with UV light from one cell side through a slit with a width of s=0.8 mm. The time of UV exposure was chosen to be about τ=1 second for each step that corresponds to the movement of the slit by 10 μm. Thus, the total time of exposure of the cell area with the width of about 0.8 mm was approximately 1.5 minutes. The resultant bi-prism had optical characteristics that were similar to the ones for a bi-prism described in Example 8. The latter one was manufactured by using a 0.8-mm wide slit, UV power density of 0.015 W/cm², and irradiation time of 3 seconds for each step, that is equivalent to the total time of exposure of the 0.7 mm-wide area of about 3 minutes.

Circularly-Symmetric Device

In a further example, a lens is fabricated with variable optical path that is similar to a converging spherical focus device, with high head-on retardation at the center of the cell and lower retardation at the edge and azimuthal symmetry. The device was made from a 20 μm-thick planar liquid crystalline cell. The fabrication process of the device started with applications of high voltage (~100V) across the entire cell for several seconds. After this pre-polymerization stage is complete, the applied voltage was decreased to the specified level and polymerization was started by irradiating a small area in the center of the cell with UV light through a round iris aperture with an adjustable diameter.

Figure 31:
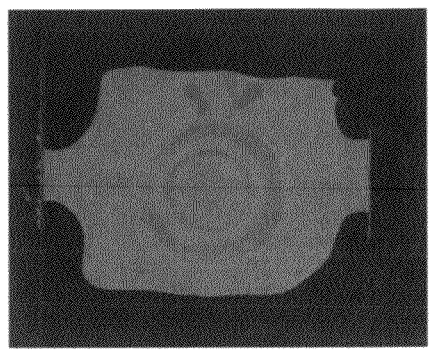
FIG. 31 is an image that shows a tunable liquid crystalline lens placed between crossed polarizers, wherein to visualize change in the cell's HOR 0.2V was applied across the cell.

After polymerizing the central spot for several seconds, the UV source was turned off and a linear stepper motor moved the cell such that the region targeted by the UV aperture was moved radially outward a very short distance from the center (~10 um). The applied curing voltage was then altered to that corresponding to a lower head-on retardation, according to the desired retardation profile, and the UV source turned on again. Another stepper motor rotated the cell in the plane of the cell about the axis through the initial center spot. Polymerization at this set voltage was continued for one full revolution of the cell. After this step was complete, the cell was moved another increment radially outward, the applied voltage was changed appropriately, the UV source turned on, and the cell rotated a complete turn again. This process was repeated until the entire device was polymerized, as desired, with a retardation gradient that fell off with increasing radius. FIG. 31 shows a tunable liquid crystalline lens recorded by using the described technique. To visualize change in the cell's HOR we placed the lens between crossed polarizers and applied 0.2V across the cell. This lens was recorded in a 20-µm cell filled with MLC6080+0.5% BAB. Pre-polymerization voltage of 100 V was applied for 1 s before each consecutive ring of the lens was recorded. In order to record the ring, the aperture s=0.8 mm was moved along the radius of the lens by 10-µm steps. The ring was recorded for each consecutive position of the aperture at the polymerization voltage corresponding to a linear voltage profile, which was similar to the one shown in FIG. 25. This lens was recorded with UV light (power density 15 mW/cm$^2$) incident from one side of the LC cell.

Figure 3A:
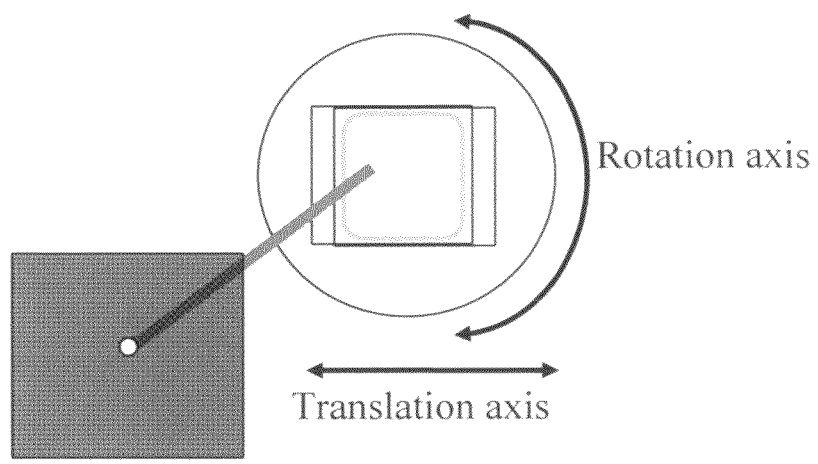
FIG. 3A is a top view of a schematic illustrating a portion of a method of the present invention.
Figure 3B:
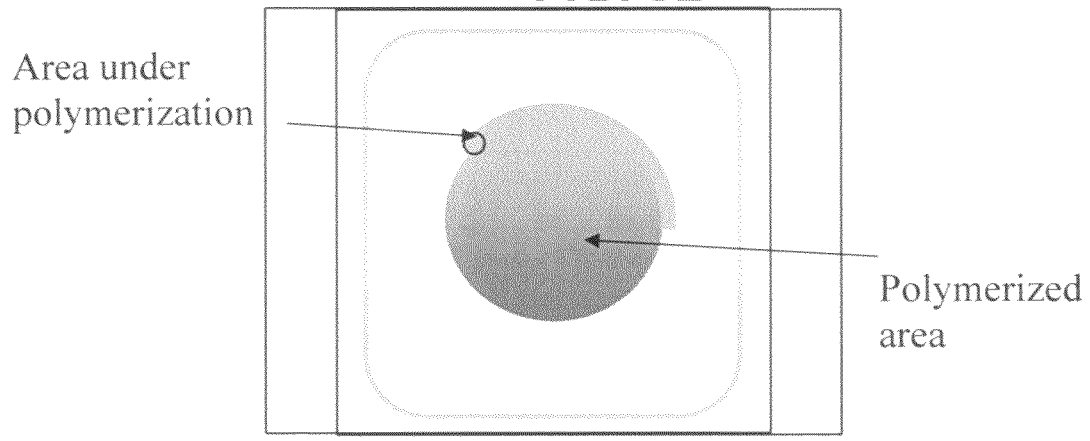
FIG. 3B is a further view of a portion of FIG. 3A.

A schematic of the movement is shown in FIGS. 3A and 3B, which show a polymerized area and another area under polymerization. The area of the UV aperture can be varied, depending on the resolution required in the refractive index gradient of the lens. Also, the irradiation time of each area can be varied as required for polymerization. The angular rotation speed ω of the cell depends on the radial distance R from the center of the lens and is given by $$\omega = v/R$$

where the recording speed v is dependent on the irradiation time t and the aperture radius r:

$$v = r/t$$

Conversely, the process of fabricating a diverging spherical lens started by creating nearly zero head-on retardation at the center of the cell and increasing the retardation as the radius increased. Once the pre-polymerization at 100 V is applied across the cell, the cell's center is exposed to UV light with a power density of 0.01 W/cm$^2$ and the desired low voltage. After this step, the device is recorded according to the procedure described above. As the cell is moved away from the center, the applied voltage is altered to create a retardance profile that is increased in radial direction, step by step, until reaching the maximum for that lens power at the lens perimeter.

It should be noted that any radially-varying lens with azimuthal symmetry can be fabricated with this procedure, not just spherical lenses. For example, it is possible to create a device that can create a spherical aberration-correcting phase profile by controlling the applied voltage to establish the required radial refractive index gradient.

Lens with an Asymmetric Phase Map

Figure 4:
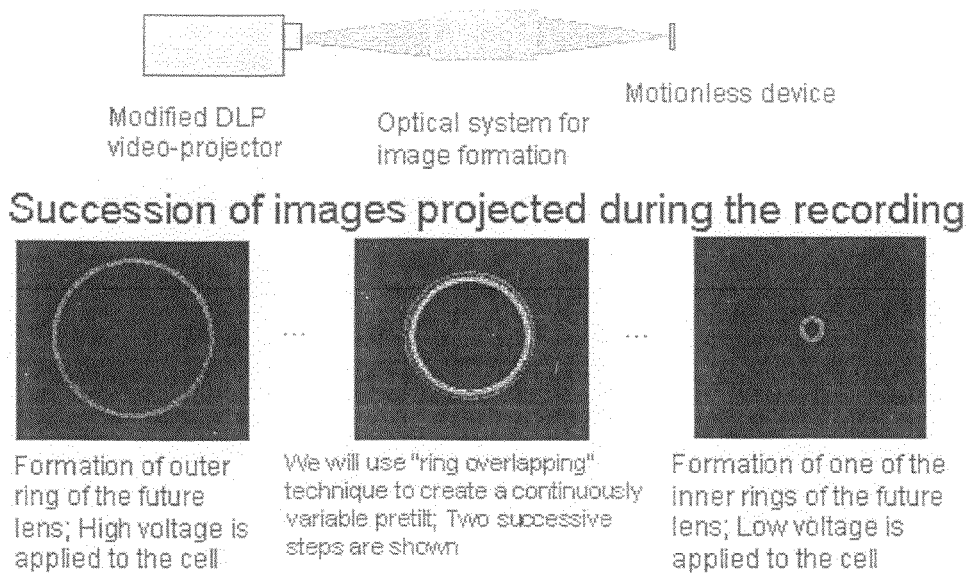
FIG. 4 is a schematic view of one embodiment of a proposed optical recorder in the present invention.

The concept for a further example is shown in FIG. 4. It is based on a projector that can provide an image in the wavelength of light which excites the photo-initiator in the LC device. The basic idea is to first stimulate the monomer migration to the substrate surface by applying high voltage (~100 V). Then the high voltage is turned off. The projector used to cure the monomer is one of several types of spatial light modulators that can deliver UV light to specific, small areas (pixels) of the liquid crystal cell. A modified digital light processor (DLP) is such an instrument.

In the next step, all cell pixels of a specific retardance are identified. The required low voltage to induce this retardance was applied to the electrodes and the UV projector was turned on such that only the identified targeted pixels are cured. Then the UV is turned off, the applied voltage altered to create a different level of retardance, and the UV projector turned on again, programmed to only irradiate the new targeted pixels for curing. The process continues until all pixels have been cured with a specific level of head-on retardation. It is apparent that any arbitrary phase map can be created quickly and efficiently in the cell to create a lens that can correct for any arbitrary distorted optical wavefront.

It should be emphasized that the projection-printing process described above can be utilized to rapidly pattern any retardance profile in any type of device or prism, and is not limited to those with asymmetric retardance profiles.

In addition, it is important to note that the retardance profile (phase map) created in the cell by this process can be switched off by applying a sufficiently high voltage to the electrodes, resulting in orientation of all liquid crystal molecules entirely in the direction of the electric field and a consequent homogeneous retardance across the entire cell.

In accordance with the patent statutes, the best mode and preferred embodiment have been set forth; the scope of the invention is not limited thereto, but rather by the scope of the attached claims.

What is claimed is:

1. A liquid crystal device, comprising:
   at least two substantially transparent substrates and an electro-active liquid crystal material layer located between the substrates and comprising a liquid crystal material and a polymer network, wherein each substrate includes a uniform alignment layer that induces a particular directional orientation of the liquid crystal material before formation of the polymer network, wherein the polymer network is derived from monomers present in an amount of about 0.01 to about 2 parts per 100 parts by weight of the liquid crystal material, and wherein the device has a patterned optically transmissive area with at least a first area and a second area present adjacent at least one of the substrates and the liquid crystals in the two areas have different resulting pre-tilt angles.

2. The liquid crystal device according to claim 1, wherein said first area has a different head on optical retardation compared to said second area.

3. The liquid crystal device according to claim 1, wherein said liquid crystal material has a higher initial pre-tilt angle in said first area as compared to said first area prior to said polymer network formation while a voltage is applied at said first area.

4. The liquid crystal device according to claim 1, wherein the device exhibits a substantially continuous change in head-on optical retardation across the optically transmissive area of the cell.

5. The liquid crystal device according to claim 1, wherein the optically transmissive area of the device has a spherical power, cylindrical power, spherical aberration, prism or a non-planar wavefront.

6. The liquid crystal device according to claim 1, wherein the device has a higher head-on optical retardation at an outer edge of the cell compared to a central area of the cell.

7. The liquid crystal device according to claim 2, wherein the device has a circular symmetry.

8. The liquid crystal device according to claim 7, wherein the device has a higher head-on optical retardation at a center of the cell and a lower head-on optical retardation at increasing radii from the center, and wherein the device has azimuthal symmetry.

9. The liquid crystal device according to claim 7, wherein the device has a lower or zero head-on optical retardation at a center of the cell and an increasing head-on optical retardation at increasing radii from the center, and wherein the device has azimuthal symmetry.

10. The liquid crystal device according to claim 1, wherein the device has a first head-on optical retardation at a center of the optically transmissive area and a lower head-on optical retardation outward from the center.

11. The liquid crystal device according to claim 10, wherein the head-on optical retardation changes substantially continuously outwardly from the center.

12. The liquid crystal device according to claim 1, wherein the device has an arbitrary head-on optical retardation profile.

13. The liquid crystal device according to claim 1, wherein a conductive electrode layer is present on each substrate, and wherein the liquid crystal material layer is in contact with the alignment layers.

14. The liquid crystal device according to claim 13, wherein resistivity of the each conductive layer, independently, is from about 10 to about 1,000 ohms/sq.

15. The liquid crystal device according to claim 14, wherein the monomer comprises a reactive mesogen, wherein liquid crystal material layer further comprises an initiator, wherein the monomer is present in an amount from about 0.1 to about 1 part per 100 parts by weight of the liquid crystal material.

16. A liquid crystal device, comprising:
at least two substantially transparent substrates and an electro active liquid crystal material layer located between the substrates and comprising a liquid crystal material and a polymer network, wherein each substrate includes an alignment layer structured to impart a substantially homogeneous molecular orientation to the liquid crystal material prior to formation of the polymer network, wherein the polymer network is derived from monomers present in an amount of about 0.01 to about 2 parts per 100 parts by weight of the liquid crystal material, and wherein the device has a patterned optically transmissive area with at least a first area and a second area present adjacent at least one of the substrates and the liquid crystals in the two areas have different resulting pre-tilt angles, and wherein the polymer network in the first area and the second area have different thicknesses.

17. The liquid crystal device according to claim 16, wherein said first area has a different head on optical retardation compared to said second area.

18. The liquid crystal device according to claim 16, wherein said liquid crystal material has a higher initial pre-tilt angle in said first area as compared to said first area prior to said polymer network formation while a voltage is applied at said first area.

19. The liquid crystal device according to claim 16, wherein the device exhibits a substantially continuous change in head-on optical retardation across the optically transmissive area of the cell.

20. The liquid crystal device according to claim 16, wherein the optically transmissive area of the device has a spherical power, cylindrical power, spherical aberration, prism or a non-planar wavefront.

21. The liquid crystal device according to claim 16, wherein the device has a higher head-on optical retardation at an outer edge of the cell compared to a central area of the cell.

22. The liquid crystal device according to claim 17, wherein the device has a circular symmetry.

23. The liquid crystal device according to claim 22, wherein the device has a higher head-on optical retardation at a center of the cell and a lower head-on optical retardation at increasing radii from the center, and wherein the device has azimuthal symmetry.

24. The liquid crystal device according to claim 22, wherein the device has a lower or zero head-on optical retardation at a center of the cell and an increasing head-on optical retardation at increasing radii from the center, and wherein the device has azimuthal symmetry.

25. The liquid crystal device according to claim 16, wherein the device has a first head-on optical retardation at a center of the optically transmissive area and a lower head-on optical retardation outward from the center.

26. The liquid crystal device according to claim 25, wherein the head-on optical retardation changes substantially continuously outwardly from the center.

27. The liquid crystal device according to claim 16, wherein the device has an arbitrary head-on optical retardation profile.

28. The liquid crystal device according to claim 16, wherein a conductive electrode layer is present on each substrate, and wherein the liquid crystal material layer is in contact with the alignment layers.

29. The liquid crystal device according to claim 28, wherein resistivity of the each conductive layer, independently, is from about 10 to about 1,000 ohms/sq.

30. The liquid crystal device according to claim 29, wherein the monomer comprises a reactive mesogen, wherein liquid crystal material layer further comprises an initiator, wherein the monomer is present in an amount from about 0.1 to about 1 part per 100 parts by weight of the liquid crystal material.

* * * * *